US 12,290,484 B2

United States Patent
Legros et al.

(10) Patent No.: US 12,290,484 B2
(45) Date of Patent: May 6, 2025

(54) MANIFOLD ASSEMBLY FOR PNEUMATIC SYSTEM

(71) Applicant: Hill-Rom Services, Inc., Batesville, IN (US)

(72) Inventors: Philippe Legros, Pluneret (FR); Anthony Thepaut, Pluneret (FR); Etienne Yvernault, Brech (FR); Pierre-Yves Le Naour, Quimperle (FR); Mikael Maho, Pluvigner (FR); Pascal Lemonnier, Locoal Mendon (FR)

(73) Assignee: Hill-Rom Services, Inc., Batesville, IN (US)

( * ) Notice: Subject to any disclaimer, the term of this patent is extended or adjusted under 35 U.S.C. 154(b) by 224 days.

(21) Appl. No.: 17/851,184

(22) Filed: Jun. 28, 2022

(65) Prior Publication Data
US 2023/0000703 A1 Jan. 5, 2023

Related U.S. Application Data

(60) Provisional application No. 63/216,591, filed on Jun. 30, 2021.

(51) Int. Cl.
*A61G 7/057* (2006.01)
*A47C 27/08* (2006.01)
(Continued)

(52) U.S. Cl.
CPC ..... *A61G 7/05776* (2013.01); *A61G 7/05769* (2013.01); *A47C 27/082* (2013.01);
(Continued)

(58) Field of Classification Search
CPC ............... A61G 7/05776; A61G 7/001; A61G 7/05769; A61G 7/05784; A47C 27/082;
(Continued)

(56) References Cited

U.S. PATENT DOCUMENTS

| 3,462,778 A | 8/1969 | Whitney |
| 3,875,967 A | 4/1975 | deFries |

(Continued)

FOREIGN PATENT DOCUMENTS

| AU | 2006214230 B2 | 10/2009 |
| CN | 2771586 Y * | 4/2006 |

(Continued)

*Primary Examiner* — David R Hare
*Assistant Examiner* — Deborah Talitha Gedeon
(74) *Attorney, Agent, or Firm* — Price Heneveld LLP

(57) ABSTRACT

A support surface assembly includes a covering defining an interior. Bladders are disposed within the interior. The bladders are operable between a deployed state and a non-deployed state. A manifold assembly is disposed within the interior of the covering. The manifold assembly includes a manifold core defining an inlet and multiple outlets. An engagement surface of the manifold core defines an inlet-connecting aperture in fluid communication with the inlet and multiple outlet-connecting apertures each in fluid communication with one of the multiple outlets. A connector includes an inner side that abuts the engagement surface of the manifold core. The inner side defines a recessed region. The connector is configured to be rotated by a motor to fluidly couple the inlet-connecting aperture with at least one of the outlet-connecting apertures to adjust the respective bladders between the deployed state and the non-deployed state.

18 Claims, 24 Drawing Sheets

(51) Int. Cl.
 *A47C 27/10* (2006.01)
 *A61H 9/00* (2006.01)
(52) U.S. Cl.
 CPC ............ *A47C 27/10* (2013.01); *A61H 9/0078* (2013.01); *Y10T 137/86863* (2015.04)
(58) Field of Classification Search
 CPC ..... A47C 27/10; A61H 9/0078; F16K 31/041; F16K 11/0743; F16K 31/055; F16K 31/105; Y10T 137/86863
 See application file for complete search history.

(56) References Cited

U.S. PATENT DOCUMENTS

| | | | |
|---|---|---|---|
| 4,197,837 A | 4/1980 | Tringali et al. | |
| 4,364,370 A | 12/1982 | Smith et al. | |
| 4,825,486 A | 5/1989 | Kimura et al. | |
| 5,109,561 A | 5/1992 | Schild | |
| 5,117,518 A | 6/1992 | Schild | |
| 5,233,974 A | 8/1993 | Senoue et al. | |
| 5,375,273 A | 12/1994 | Bodine, Jr. et al. | |
| 6,058,538 A | 5/2000 | Chapman et al. | |
| 6,148,461 A | 11/2000 | Cook et al. | |
| 6,282,737 B1 | 9/2001 | Vrzalik | |
| 6,324,845 B1 | 12/2001 | Fulks et al. | |
| 6,349,439 B1 | 2/2002 | Cook et al. | |
| 6,711,771 B2 | 3/2004 | Cook et al. | |
| 6,721,979 B1 | 4/2004 | Vrzalik et al. | |
| 6,745,996 B1* | 6/2004 | Guthrie ................ | F16K 11/074 5/713 |
| 6,789,284 B2 | 9/2004 | Kemp | |
| 6,877,178 B2 | 4/2005 | Chapman et al. | |
| 6,928,681 B1 | 8/2005 | Stacy | |
| 7,219,380 B2 | 5/2007 | Beck et al. | |
| 7,444,704 B2 | 11/2008 | Phillips et al. | |
| 7,784,132 B2 | 8/2010 | Gonzalez et al. | |
| 9,801,767 B2 | 10/2017 | Gowda et al. | |
| 9,890,548 B2 | 2/2018 | Malinasky, Jr. | |
| 10,034,808 B2 | 7/2018 | Vrzalik et al. | |
| 10,856,668 B2 | 12/2020 | Ye et al. | |
| 10,959,536 B2 | 3/2021 | Ye et al. | |
| 2002/0121307 A1* | 9/2002 | Stacy ..................... | F16K 11/074 137/624.13 |
| 2006/0167389 A1 | 7/2006 | Evans et al. | |
| 2006/0236464 A1* | 10/2006 | Beck .................. | A61G 7/05776 5/713 |
| 2009/0217460 A1* | 9/2009 | Bobey ................ | A61G 7/05784 5/709 |
| 2014/0259432 A1 | 9/2014 | Gowda et al. | |
| 2018/0289174 A1* | 10/2018 | Ye ........................ | A47C 21/006 |
| 2019/0021925 A1 | 1/2019 | Jiang et al. | |
| 2019/0110607 A1 | 4/2019 | Ye et al. | |
| 2019/0151175 A1 | 5/2019 | Kelch et al. | |
| 2019/0358115 A1 | 11/2019 | Waldridge | |
| 2021/0259899 A1 | 8/2021 | Maho et al. | |
| 2023/0000703 A1 | 1/2023 | Legros et al. | |

FOREIGN PATENT DOCUMENTS

| | | |
|---|---|---|
| CN | 204193300 U | 3/2015 |
| CN | 209790251 U | 12/2019 |
| CN | 210785103 U | 6/2020 |
| CN | 211202967 U | 8/2020 |
| CN | 211300811 U | 8/2020 |
| CN | 111728814 A * | 10/2020 |
| CN | 111779860 B | 4/2021 |
| EP | 3107514 B1 | 9/2020 |
| FR | 1291237 A | 4/1962 |
| FR | 2990479 A1 | 12/2015 |
| GB | 2344153 B | 5/2000 |
| JP | 5584827 A | 6/1980 |
| JP | S59166769 A | 9/1984 |
| KR | 19980034263 U | 9/1998 |
| SE | 452209 B | 11/1987 |
| TW | M316333 U | 8/2007 |
| TW | M351966 U | 3/2009 |
| WO | 2016018914 A2 | 2/2016 |
| WO | 2020174418 A1 | 9/2020 |
| WO | 2023277759 A1 | 6/2021 |
| WO | 2023277760 A1 | 6/2021 |

* cited by examiner

MANIFOLD ASSEMBLY FOR PNEUMATIC SYSTEM

CROSS-REFERENCE TO RELATED APPLICATION

This application claims priority to and the benefit under 35 U.S.C. § 119(e) of U.S. Provisional Application No. 63/216,591, filed on Jun. 30, 2021, entitled "MANIFOLD ASSEMBLY FOR PNEUMATIC SYSTEM," the disclosure of which is hereby incorporated herein by reference in its entirety.

FIELD OF THE DISCLOSURE

The present disclosure generally relates to a manifold assembly, and more particularly to a manifold assembly for a pneumatic system for a patient support apparatus.

SUMMARY OF THE DISCLOSURE

According to one aspect of the present disclosure, a patient support apparatus includes a frame having a supporting surface. A mattress is disposed on the supporting surface. The mattress defines an interior. Bladders are disposed within the interior of the mattress and a manifold assembly is disposed within the interior of the mattress. The manifold assembly is in fluid communication with the bladders. The manifold assembly includes a manifold core having an inlet and multiple outlets. Each bladder is in fluid communication with one of the outlets. A connector is coupled to the manifold core. The connector has an inner side defining a recessed region. The inner side abuts the manifold core. A motor is configured to rotate the connector relative to the manifold core to fluidly couple the inlet with at least one of the outlets via an airflow passage defined at least partially by the recessed region.

According to another aspect of the present disclosure, a mattress includes a covering, which defines an interior. Multiple bladders are disposed within the interior. A manifold assembly is disposed within the interior. The manifold assembly includes a manifold core having an inlet tube extending from a first side thereof and defining an inlet and the manifold core has outlet tubes extending from a second side thereof. Each outlet tube defines an outlet. Each of the multiple bladders is in fluid communication with one of the outlets. A connector is coupled to the manifold core. The connector is configured to rotate between multiple positions to adjust the fluid communication between the inlet and at least one of the outlets. A blower is disposed within the interior of the mattress and in fluid communication with the inlet of the manifold assembly.

According to another aspect of the present disclosure, a pneumatic system for a mattress includes bladders operable between a deployed state and a non-deployed state. A housing is configured to be disposed within an interior of said mattress. A manifold assembly is disposed within the housing and in fluid communication with the bladders. The manifold assembly includes a manifold core having an inlet and outlets. An engagement surface of the manifold core defines an inlet-connecting aperture in fluid communication with the inlet and defines outlet-connecting apertures each in fluid communication with one of the outlets. A connector is rotatably coupled to the manifold core. The connector is configured to rotate between multiple positions relative to the manifold core to fluidly couple the inlet-connecting aperture with at least one outlet-connecting apertures.

These and other features, advantages, and objects of the present disclosure will be further understood and appreciated by those skilled in the art by reference to the following specification, claims, and appended drawings.

DETAILED DESCRIPTION

Figure 1:
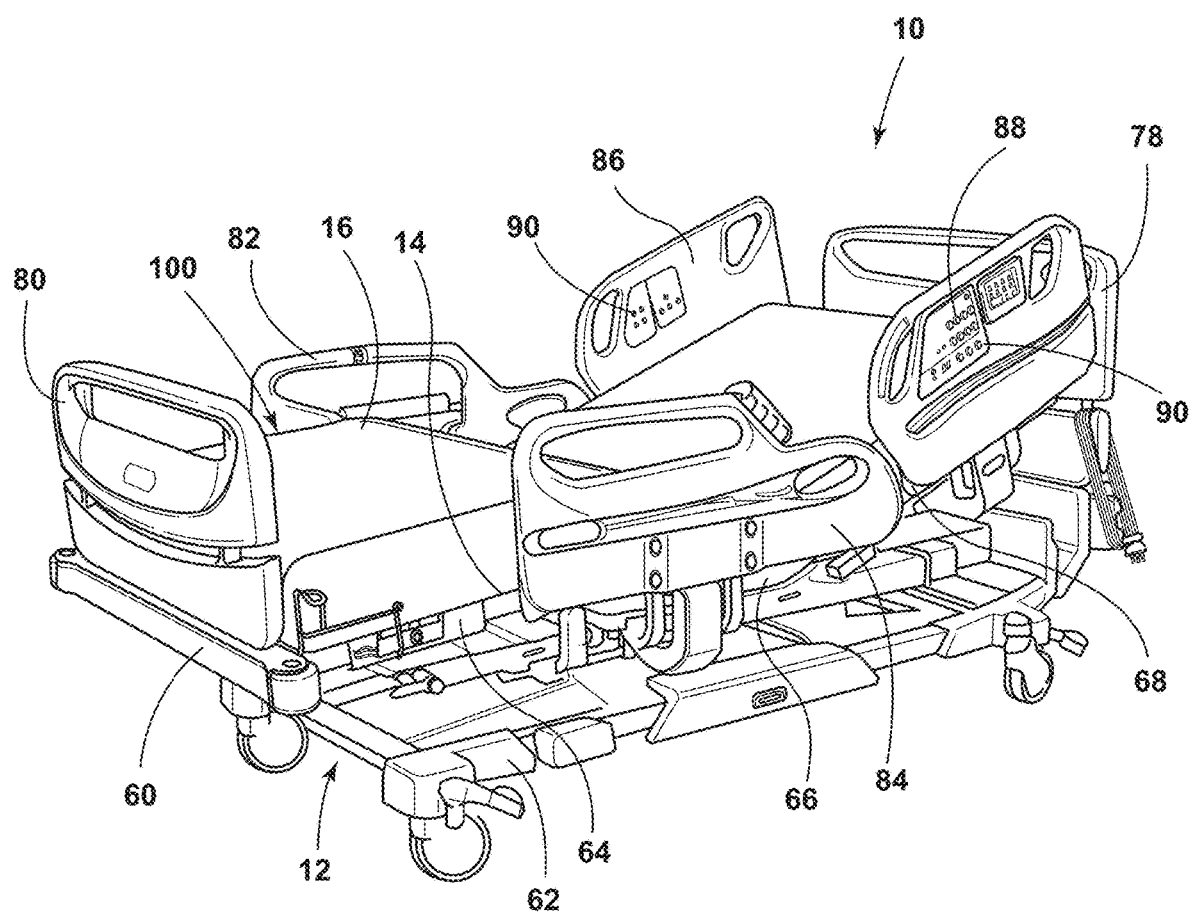
FIG. 1 is a side perspective view of a patient support apparatus, according to the present disclosure.

The present illustrated embodiments reside primarily in combinations of method steps and apparatus components related to a manifold assembly fora pneumatic system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-34, reference numeral 10 generally designates a patient support apparatus 10 having a frame 12 with a supporting surface 14. A mattress 16 is disposed on the supporting surface 14. The mattress 16 defines an interior 18. Bladders 20 are disposed within the interior 18 of the mattress 16. A manifold assembly 22 is in fluid communication with the bladders 20. The manifold assembly 22 includes a manifold core 24 having an inlet 26 and multiple outlets 28, 30, 32, 34. Each bladder 20 is in fluid communication with one of the outlets 28, 30, 32, 34. The connector 36 is coupled to the manifold core 24. The connector 36 has an inner side 38 that defines a recessed region 40. The inner side 38 is configured to abut the manifold core 24. A motor 42 is configured to rotate the connector 36 relative to the manifold core 24 to fluidly couple the inlet 26 with at least one of the outlets 28, 30, 32, 34 via an airflow passage 44 at least partially defined by the recessed region 40.

Referring to FIG. 1, the support apparatus 10 is configured as a medical bed for use in a medical facility that includes an upper frame 60 and a base frame 62, which are collectively referred to herein as the frame 12. The upper frame 60 is generally adjustable relative to the base frame 62 (e.g., height, tilt, etc.). Additionally, the upper frame 60 includes multiple segments 64, 66, 68 that are independently movable relative to each other. The independently movable segments 64, 66, 68 allow for various portions of the upper frame 60 to be adjusted, such as, for example, an elevated head region or an elevated foot region. The segments 64, 66, 68 collectively form the supporting surface 14 for supporting the mattress 16 thereon.

The support apparatus 10 includes a headboard 78 that is selectively coupled to a head end of the support apparatus 10 and a footboard 80 that is selectively coupled to a foot end of the support apparatus 10. Each of the headboard 78 and the footboard 80 may be fixedly coupled to the frame 12, or alternatively may be removed from the support apparatus 10 to provide increased access to the patient. The support apparatus 10 include multiple base region siderails 82, 84 and multiple head region siderails 86, 88. Each of the siderails 82, 84, 86, 88 are operable between raised and lowered states to selectively allow access to the patient and ingress and egress from the support apparatus 10.

In various examples, a connected user device 90 is coupled to at least one of the siderails 88 or disposed elsewhere on the support apparatus 10. The connected user device 90 may include buttons or other selectable features that allow a caregiver or a patient to adjust aspects of the support apparatus 10 or the mattress 16. While the support apparatus 10 is illustrated as the medical bed, the support apparatus 10 may be the medical bed, a stretcher, an examination table, an operating or surgical table, a recliner, etc. without departing from the teachings herein.

Figure 2:
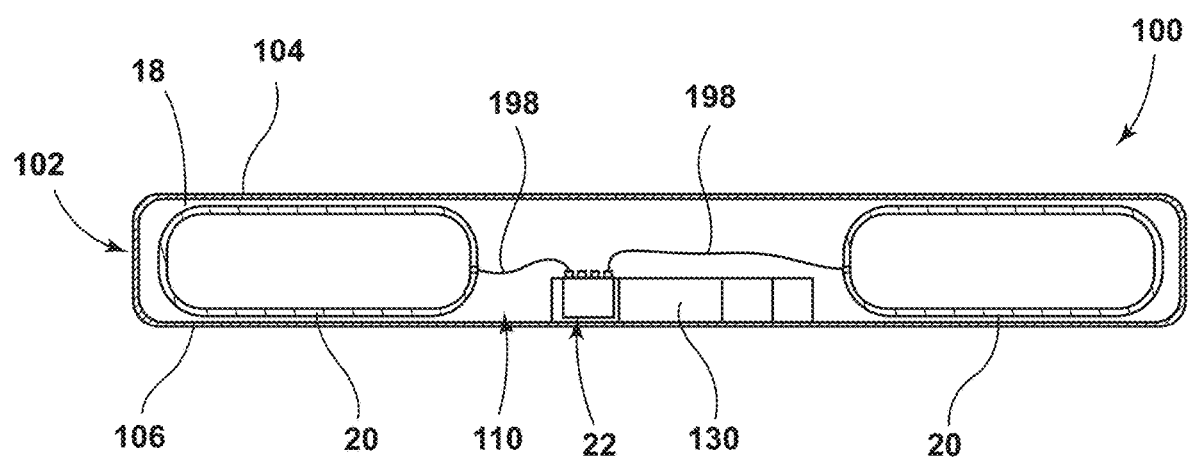
FIG. 2 is a cross-sectional view of a pneumatic system within a mattress, according to the present disclosure.

Referring to FIG. 2, a support surface assembly 100 is disposed on the supporting surface 14 of the support apparatus 10. In the illustrated configuration, the support surface assembly 100 is illustrated as the mattress 16. However, the support surface assembly 100 may be the mattress 16, a mattress pad, a coverlet, or other features for supporting a patient thereon.

The support surface assembly 100, including the illustrated mattress 16, generally includes a covering 102 or outer surface that defines the interior 18. The covering 102 may be removable from the remainder of the support surface assembly 100 to clean or change the covering 102. The covering 102 may include an upper covering portion 104 that couples to a base covering portion 106 to enclose the interior 18. The upper and base covering portions 104, 106 may be selectively coupled together to allow the caregiver to access the interior 18 of the support surface assembly 100. Access to the interior 18 may be advantageous for inserting or adjusting the manifold assembly 22 described herein.

Figure 3:
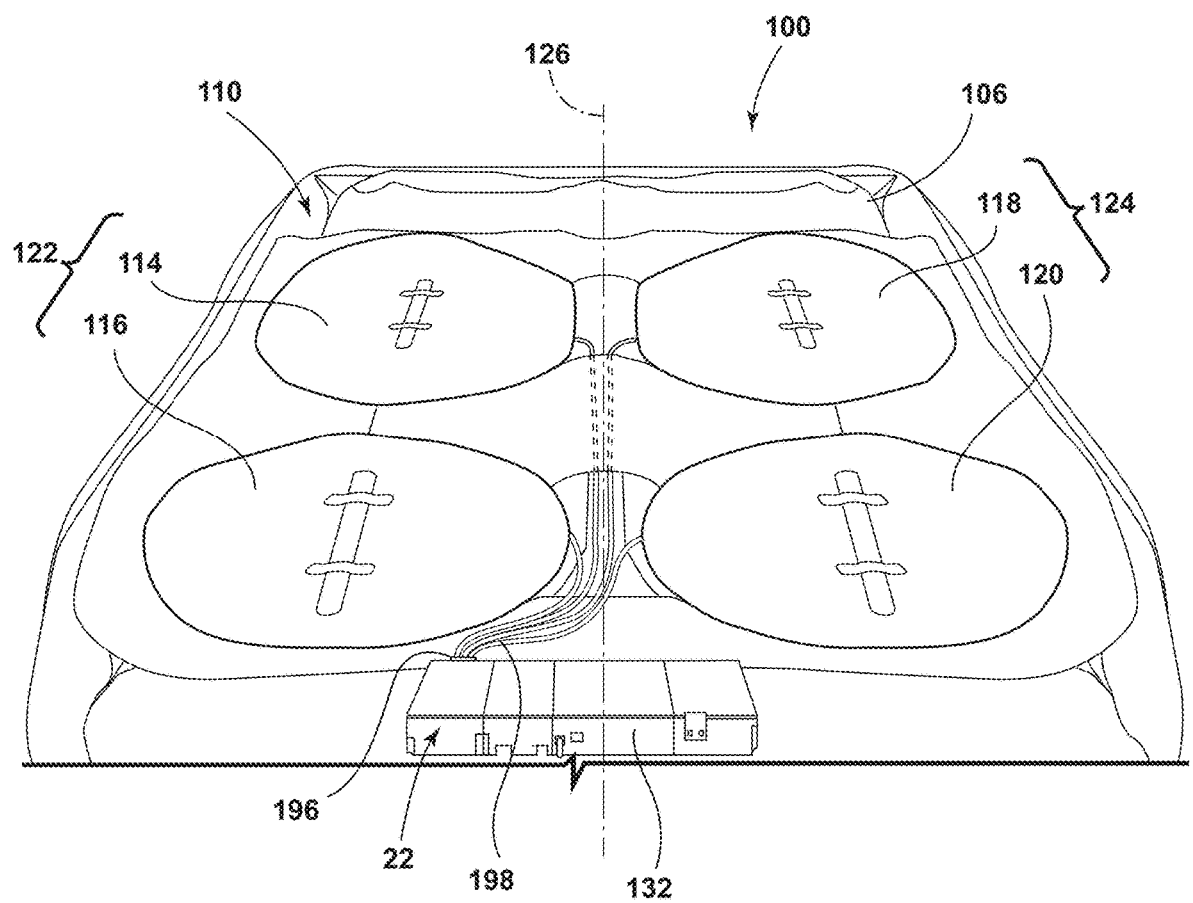
FIG. 3 is a top perspective view of a pneumatic system for a mattress having bladders in fluid communication with a manifold assembly, according to the present disclosure.

Referring still to FIG. 2, as well as to FIG. 3, a pneumatic system 110 is disposed within the interior 18 defined by the covering 102. The pneumatic system 110 may be utilized for certain therapies and protocols, such as rotation (e.g., turn assist), pulmonary therapy (e.g., continuous lateral rotation therapy), and lateral pressure redistribution. The pneumatic system 110 generally includes the bladders 20, the manifold assembly 22, and a blower 112. The bladders 20 are each selectively and independently operable between a deployed state and a non-deployed state. Fluid is directed from the blower 112, through the manifold assembly 22, and to the bladders 20 to adjust the bladders 20 to the deployed state. Fluid may also be directed from the bladders 20 and through at least one of the manifold assembly 22 and the blower 112 to adjust the bladders 20 to the non-deployed state. In various aspects, the deployed state is an inflated condition and the non-deployed state is a deflated condition. The bladders 20 are utilized to provide the various therapies and to support the patient as described further herein.

Referring still to FIG. 3, in the illustrated configuration, the mattress 16 includes four bladders 114, 116, 118, 120, which are collectively referred to herein as the bladders 20. The bladders 20 are generally arranged in a square or rectangular configuration. The bladders 20 are arranged in two pairs 122, 124, with each pair 122, 124 having one bladder 114, 118 under a back region of the patient and one bladder 116, 120 under the sacral region of the patient. The first pair 122 of the bladders 114, 116 and the second pair 124 of the bladders 118, 120 are on opposing sides of a central longitudinal axis 126 of the mattress 16. The bladders 114, 116, 118, 120 in each pair 122, 124 are aligned in a longitudinal direction. The bladders 114, 116 in the first pair 122 are also laterally aligned with the bladders 118, 120 in the second pair 124. The configuration is advantageous for providing even distribution of pressure from the bladders 20 on both sides of the patient.

The bladders 20 are adjusted by the blower 112, which includes an electrical connector 128 for receiving power and control signals from a control box 130. The control box 130 is disposed within the interior 18 thereof. The control box 130 includes various electronics 132 that relate to functions of the mattress 16, such as control of the blower 112, the motor 42, etc. The pneumatic system 110 includes a housing 140 for the blower 112 and the manifold assembly 22, which may be selectively coupled to the control box 130. In this way, the manifold assembly 22 may be integrated with or embedded in the mattress 16 similar to the control box 130. The manifold assembly 22 may be relatively lightweight, which may be advantageous for providing a lighter mattress 16 for the caregiver to move.

The electronics 132 are electrically coupled to various features of the manifold assembly 22 and the pneumatic system 110. For example, similar to the bower 112, the motor 42 may be electrically coupled to the electronics 132 to receive power and activation signals. Other features, such as those that monitor information about the manifold assembly 22, may also be coupled to the electronics 132 to receive power, as well as communicate sensed information as described herein.

Figure 4:
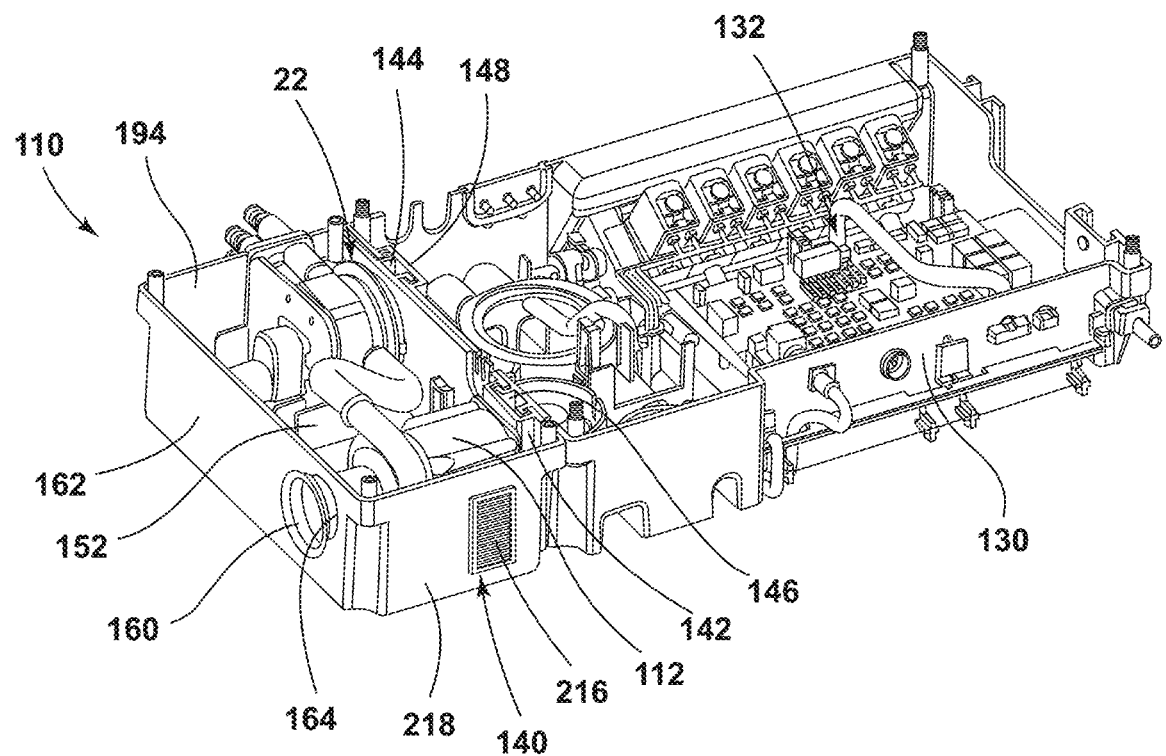
FIG. 4 is a top perspective view of a housing of a pneumatic system with a manifold assembly and a blower therein with the housing coupled to a control box, according to the present disclosure.

Referring to FIGS. 4-7, the housing 140 generally includes coupling features 142, 144 that mate with corresponding coupling features 146, 148 of the control box 130. As best illustrated in FIG. 4, the coupling features 142, 144 defined by the housing 140 include a groove 142 and a rail 144. The coupling features 146, 148 of the control box 130 also include a groove 146 and a rail 148. The groove 142 of the housing 140 is configured to slidably receive the rail 148 of the control box 130, and the rail 144 of the housing 140 is configured to slidably engage the groove 146 of the control box 130. The rails 144, 148 are generally two opposing L-shaped members that are inserted into the respective grooves 142, 146, allowing motion in a first direction (e.g., illustrated as movement along a y-direction) and preventing separation in a second direction that is perpendicular to the first direction (e.g., illustrated as movement along an x-direction). The housing 140 may slidably couple with the control box 130 for convenient engagement and disengagement of the manifold assembly 22 with the mattress 16.

The blower 112 and the manifold assembly 22 are disposed substantially within the housing 140, providing a compact assembly within the mattress 16 for adjusting the bladders 20. The housing 140 includes a selectively removable top 150 to access an interior 152 of the housing 140. The blower 112 and the manifold assembly 22 operate to direct fluid into and out of the bladders 20. Generally, the fluid is air but may be other fluid without departing from the teachings herein. The blower 112 generally includes an intake tube 160 that extends partially outside of the housing 140. A side 162 of the housing 140 defines an aperture 164, and the intake tube 160 of the housing 140 extends through the aperture 164. The intake tube 160 allows the blower 112 to draw air from the interior 18 of the mattress 16 into the pneumatic system 110, as well as expel air from the pneumatic system 110 into the interior 18 of the mattress 16. The mattress 16 is generally not airtight to allow the inflow and outflow of air from the housing 140 without substantially affecting pressure within the mattress 16.

The manifold core 24 includes an inlet tube 170 defining the inlet 26 on a first side 172 thereof. The blower 112 is in fluid communication with the inlet 26 via tubing 174. The tubing 174 generally extends around the inlet tube 170. The manifold core 24 also includes multiple outlet tubes 176, 178, 180, 182 each defining one outlet 28, 30, 32, 34, respectively, on a second opposing side 184 of the manifold core 24. In the illustrated configuration, the manifold assembly 22 includes four outlet tubes 176, 178, 180, 182, with each outlet tube 176, 178, 180, 182 corresponding to and in fluid communication with one of the four bladders 114, 116, 118, 120. Generally, the inlet tube 170 and the outlet tubes 176, 178, 180, 182 are arranged in a parallel configuration.

Figure 5:
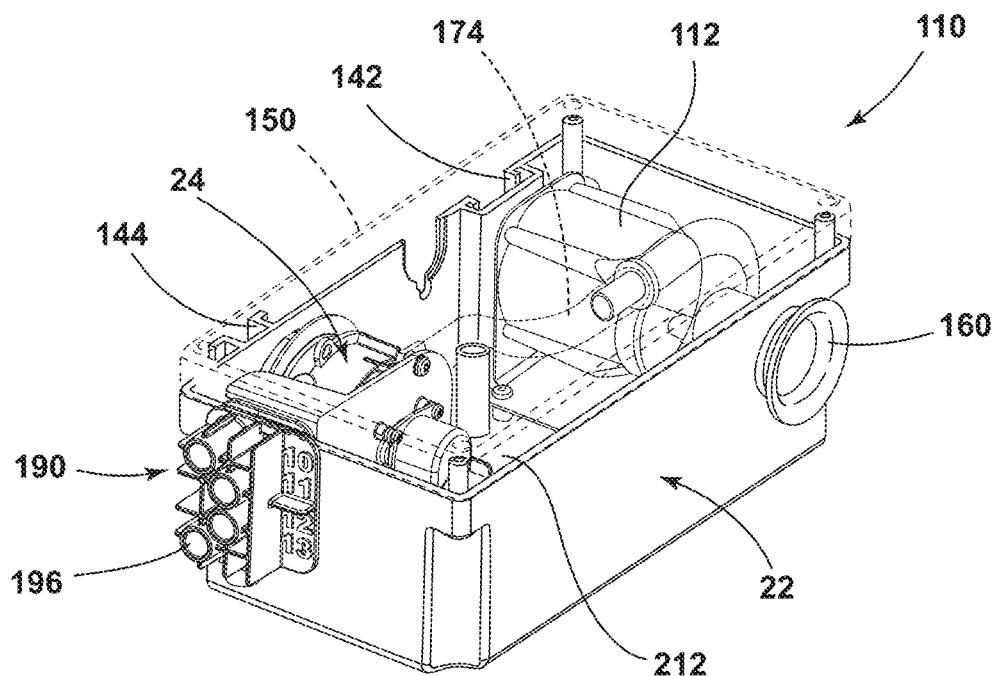
FIG. 5 is a side perspective view of a housing with a manifold assembly and a blower therein, according to the present disclosure.
Figure 6:
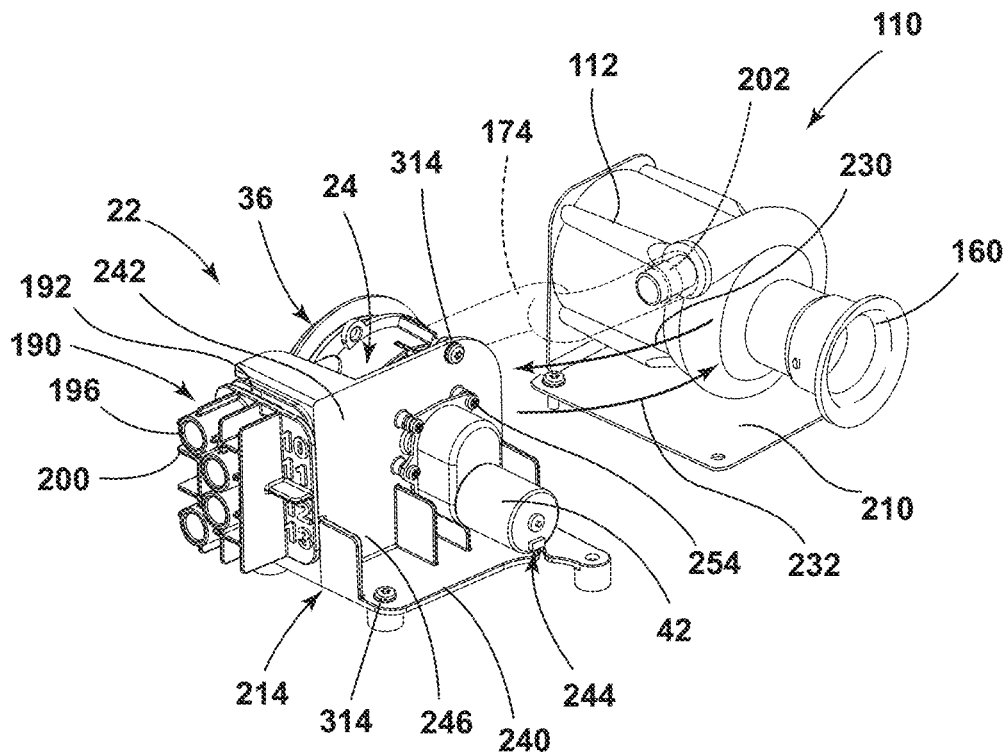
FIG. 6 is a side perspective view of a manifold assembly in fluid communication with a blower for a pneumatic system, according to the present disclosure.

Referring still to FIGS. 4-7, the manifold assembly 22 includes an outlet cap 190 that couples with the outlet tubes 176, 178, 180, 182. The outlet cap 190 is generally sized and shaped to fit about or around the four outlet tubes 176, 178, 180, 182. The outlet cap 190 extends partially into the housing 140 and partially out of the housing 140. The outlet cap 190 also includes a rim 192, which engages a side 194 of the housing 140 to retain the outlet cap 190 in the selected position relative to the housing 140. Generally, as illustrated in FIG. 6, the side 194 through which the outlet cap 190 extends is an adjacent side of the housing 140 relative to the side 162 that defines in the aperture 164 through which the intake tube 160 of the blower 112 extends.

Figure 7:
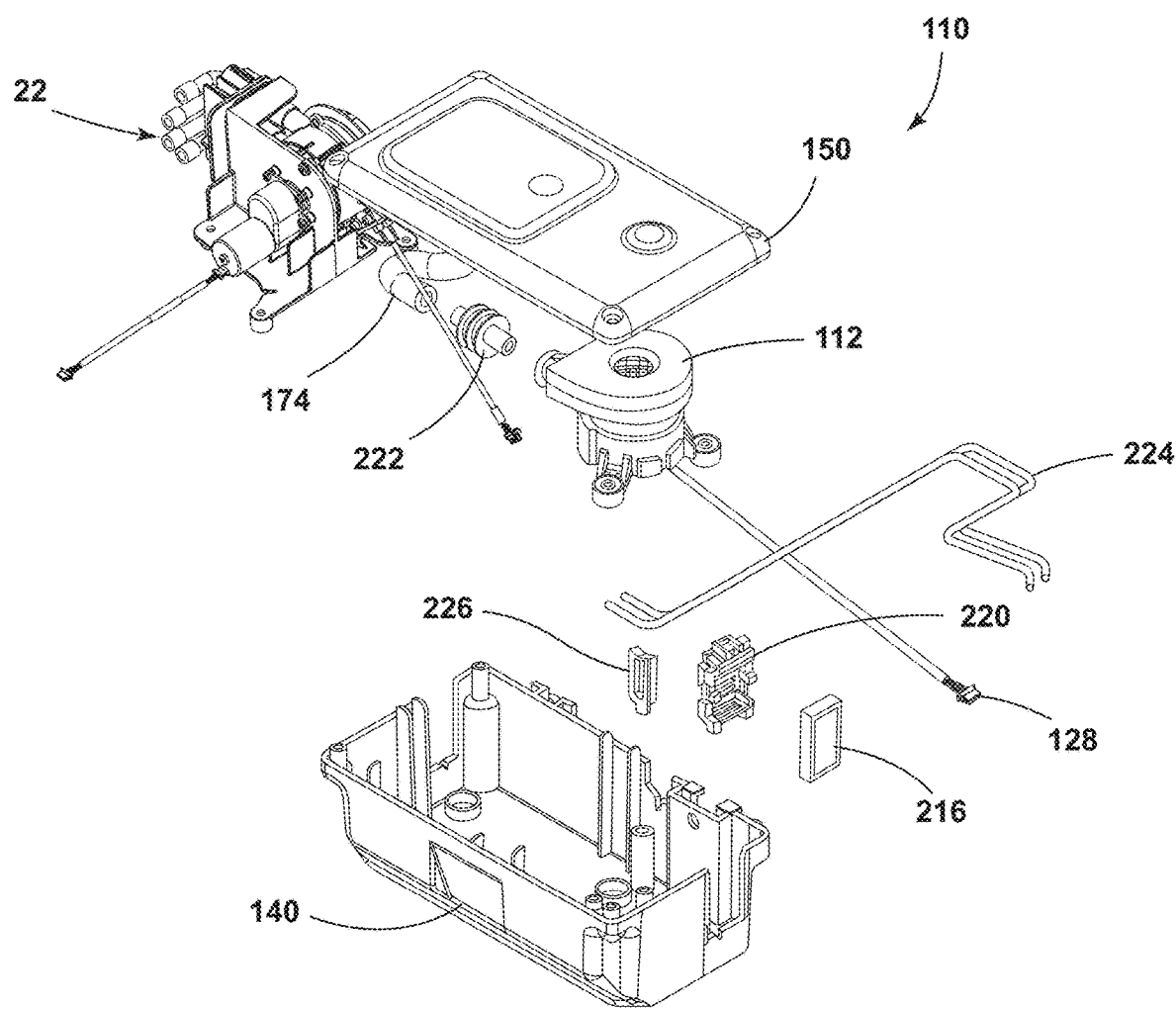
FIG. 7 is a side perspective exploded view of a portion of a pneumatic system, according to the present disclosure.

The outlet cap 190 includes outlet engagement tubes 196 that are disposed outside of the housing 140. Each outlet engagement tube 196 aligns with one of the outlet tubes 176, 178, 180, 182 of the manifold core 24. The outlet engagement tubes 196 form extensions of the outlet tubes 176, 178, 180, 182 to engage tubing 198 outside of the housing 140. The outlet engagement tubes 196 may extend generally parallel to the outlet tubes 176, 178, 180, 182, as illustrated in FIG. 5, or may extend generally perpendicular to the outlet tubes 176, 178, 180, 182, as illustrated in FIG. 7. The configuration of the outlet engagement tubes 196 may assist in coupling with the tubing 198.

The manifold assembly 22 is in fluid communication with each of the bladders 20 via the tubing 198. The tubing 198 extends through the interior 18 of the mattress 16, between the bladders 20 and the outlet cap 190. The tubing 198 directs fluid between the manifold assembly 22 and the bladders 20 based on the operation of the pneumatic system 110. The tubing 198 fits about ends 200 of the outlet engagement tubes 196 to fluidly couple the manifold core 24 to the bladders 20.

The manifold assembly 22, including the engagements between the manifold assembly 22 and the various tubing 174, 198 of the pneumatic system 110, is an airtight assembly to prevent leakage of the fluid moving through the pneumatic system 110. For example, in various locations, the manifold assembly 22 includes a sealant 202 to provide this airtight engagement. The sealant 202 is generally grease disposed between two coupled components. The grease provides the airtight engagement while reducing the number of components included in the pneumatic system 110.

Referring still to FIGS. 4-7, the blower 112 is coupled to a support frame 210, which may be fixedly coupled to a bottom 212 of the housing 140. The support frame 210 retains the blower 112 in the selected position. The manifold core 24 is coupled to a support member 214, which is coupled to the bottom 212 of the housing 140 spaced from the support frame 210 for the blower 112. The support frame 210 and the support member 214 each retain the selected position of the supported components (i.e., the blower 112 and the manifold core 24, respectively, including the spacing between the supported components. In this way, the spacing and arrangement between the blower 112 and the manifold core 24 are retained as the mattress 16 is moved, the patient moves on the mattress 16, or as pressure through the pneumatic system 110 changes.

The housing 140 may include a filter 216 on one side 218 thereof. The filter 216 is coupled to the housing 140 via a retainer 220. The filter 216 allows air to flow into and out of the housing 140. It is contemplated that air removed from the bladders 20 may be released into the interior 152 of the housing 140. This filter 216 may be advantageous for allowing air to flow from the housing 140 to reduce a buildup pressure around the manifold assembly 22. The filter 216 also allows air to be drawn into the housing 140 to be used by the blower 112.

Referring still to FIGS. 4-7, in various aspects, additional components are included to manage the pressure change within the pneumatic system 110. For example, the blower 112 is a radial blower 112. The blower 112 is coupled to the tubing 174 via a pressure connector 222. The pressure connector 222 maintains the connection between the blower 112 and the tubing 174, particularly under pressure changes caused by activation of the blower 112. The engagement between the pressure connector 222 and the blower 112 may include the sealant 202 to maintain the airtight connection therebetween.

The pneumatic system 110 may also include additional hosing 224 in the housing 140. The hosing 224 may extend from the blower 112 and through the housing 140. The hosing 224 may be utilized for guiding air from the blower 112 and out of the housing 140 to reduce the building up pressure within the housing 140. The hosing 224 may be maintained in position via a holder 226 coupled to the housing 140. The holder 226 may be advantageous for minimizing movement of the hosing 224 caused by pressure changes within the hosing 224 from activation of the blower 112.

Each bladder 20 is in fluid communication with one of the outlets 28, 30, 32, 34 of the manifold core 24. Accordingly, fluid directed through one outlet 28, 30, 32, 34 affects the corresponding bladder 20 without affecting the remaining bladders 20 of the pneumatic system 110. The bladders 20 may be independently and selectively adjusted between the deployed and the non-deployed states. Generally, the deployed state is an inflated condition while the non-deployed state is a deflated condition. Air travels in a first direction, illustrated by arrow 230, through the blower 112 and the manifold assembly 22 to inflate the bladders 20 and a second opposing direction, illustrated by arrow 232, from the bladders 20 through at least one of the manifold assembly 22 and through the blower 112 to deflate the bladders 20.

The inflated condition may be any level of inflation from a fully deflated condition. In such examples, the deflated condition is a fully deflated condition. Additionally or alternatively, the inflated condition and the deflated condition may be relative to a previous state of the bladders 20. In such examples, the deflated condition may be a less inflated condition than a previous state of the bladders 20 (i.e., some amount of air released from the bladders 20), and the inflated condition may be a more inflated condition (i.e., some amount of air directed into the bladders 20).

Figure 8:
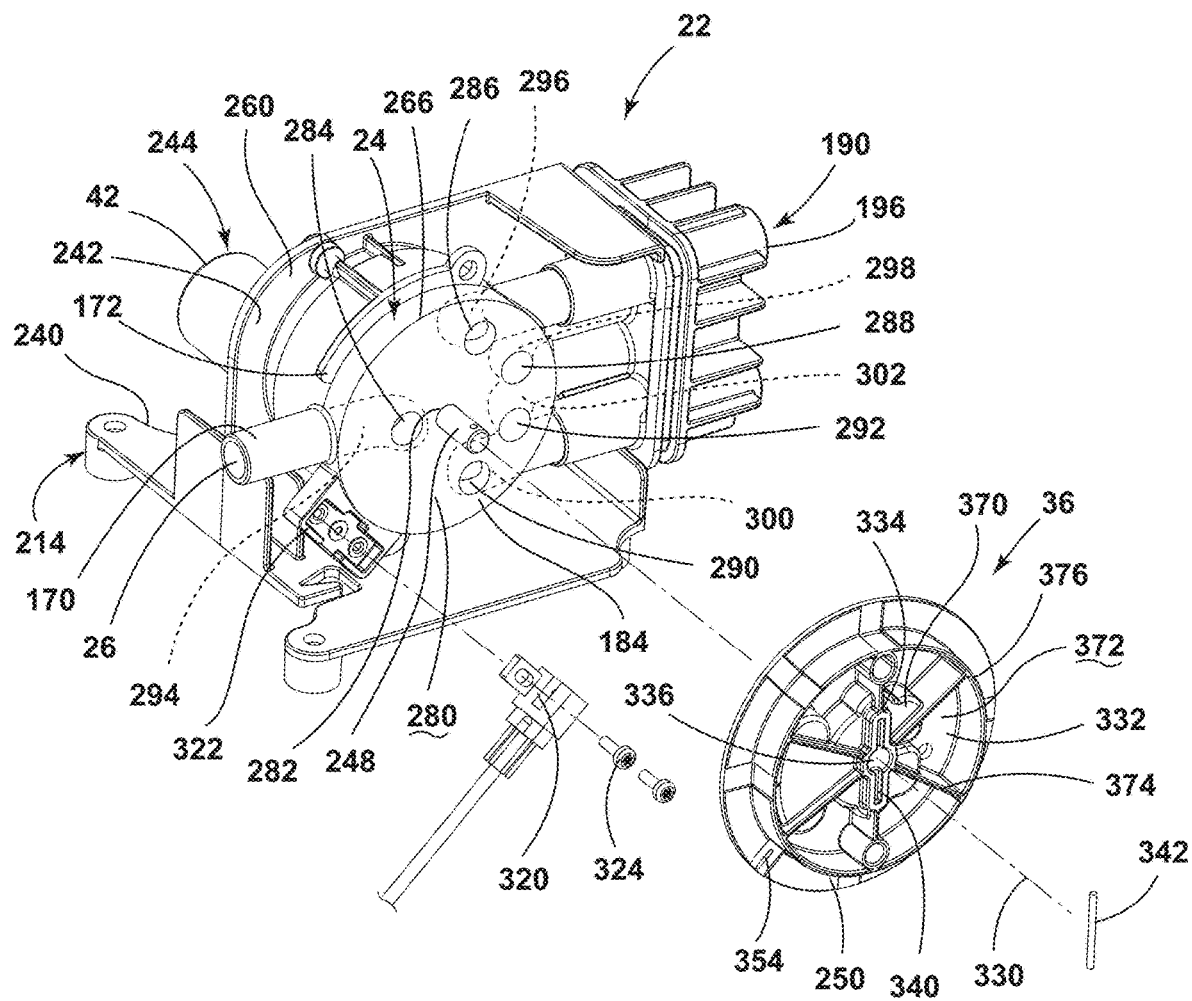
FIG. 8 is a side perspective partial exploded view of a manifold assembly for a pneumatic system, according to the present disclosure.

Referring to FIG. 8, the manifold assembly 22 includes the support member 214, which has a base 240 and a support wall 242 extending from the base 240. The support wall 242 is generally positioned in a central location on the base 240, allowing components to be supported on each side of the support wall 242 over the base 240. The manifold assembly 22 includes a motor assembly 244, which is positioned substantially on a first side 246 of the support wall 242. The motor assembly 244 includes the motor 42 and a driveshaft 248 coupled to the motor 42. In various examples, the motor 42 is configured as a stepper motor 42, which may rotate the connector 36 to specific positions, as described further herein.

The motor 42 may pilot the function of the manifold assembly 22 by rotating the connector 36. The motor 42 is configured to turn or rotate in two opposing directions 250, 252 (i.e., a positive or clockwise direction 250 and a negative or counterclockwise direction 252). The motor 42 is generally fixedly coupled to the support member 214 via fasteners 254. The fasteners 254 may be screws, nails, bolts, or other coupling members. The driveshaft 248 extends through the support wall 242 to engage other components of the manifold assembly 22, such as the connector 36.

On a second opposing side 260 of the support wall 242, the support wall 242 includes a rim 262, which is generally an annular rim 262 defining a space for a biasing member 264. The biasing member 264 is at least partially disposed within the space defined by the rim 262 and the support wall 242. The biasing member 264 may be, for example, a compression spring. The compression spring is generally a conical or frusto-conical shape. The conical or frusto-conical shape allows for greater compression of the biasing member 264 to reduce the space utilized by the biasing member 264. In such examples, the compression spring has a first diameter proximate to the support wall 242 and a second diameter proximate to the manifold core 24, where the second diameter is larger than the first diameter.

In certain aspects, the compression spring may apply about two kilograms of force on the manifold core 24. The manifold assembly 22 typically includes the single biasing member 264. The biasing member 264 extends around the driveshaft 248 and engages a central portion 266 of the manifold core 24. The biasing member 264 extends between the support wall 242 and the manifold core 24 to bias the manifold core 24 away from the support wall 242 and toward the connector 36.

Figure 9:
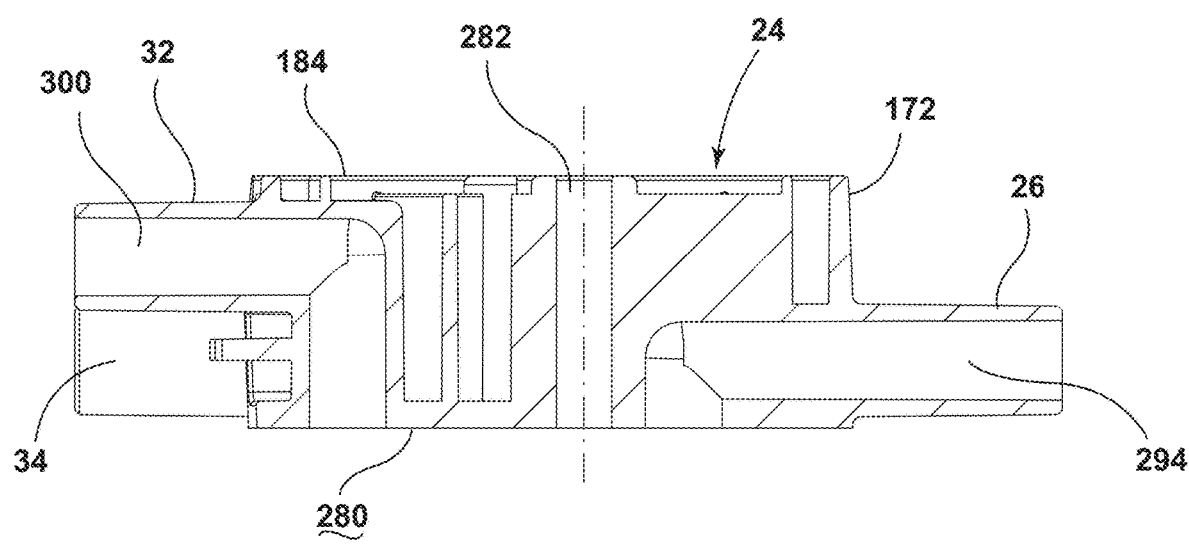
FIG. 9 is a cross-sectional view of a manifold core with channels extending therethrough, according to the present disclosure.

Referring still to FIG. 8, as well as FIG. 9, the manifold core 24 includes the inlet tube 170 on one side 172 and the outlet tubes 176, 178, 180, 182 on the opposing side 184 thereof. The manifold core 24 has an engagement surface 280, which faces away from the support wall 242 and is oriented toward the connector 36. The manifold core 24 defines a driveshaft aperture 282 in the center thereof in which the driveshaft 248 extends to engage the connector 36. Additionally, the engagement surface 280 defines an inlet-connecting aperture 284 on the side 172 adjacent to the inlet 26 and outlet-connecting aperture 286, 288, 290, 292 on the side 184 adjacent to the outlets 28, 30, 32, 34. The inlet-connecting aperture 284 is in fluid communication with the inlet 26 such that an inlet channel 294 extends through the manifold core 24 from the inlet 26 to the inlet-connecting aperture 284.

Each of the outlet-connecting apertures 286, 288, 290, 292 is in fluid communication with one of the outlets 28, 30, 32, 34. Accordingly, in the illustrated example, there are four outlet channels 296, 298, 300, 302 that extend through the manifold core 24 between the outlet-connecting apertures 286, 288, 290, 292 and outlets 28, 30, 32, 34, respectively. Fluid traveling through the manifold core 24 to the bladders 20 travels through the inlet channel 294, along the engagement surface 280, and through one or more of the outlet channels 296, 298, 300, 302.

Figure 10:
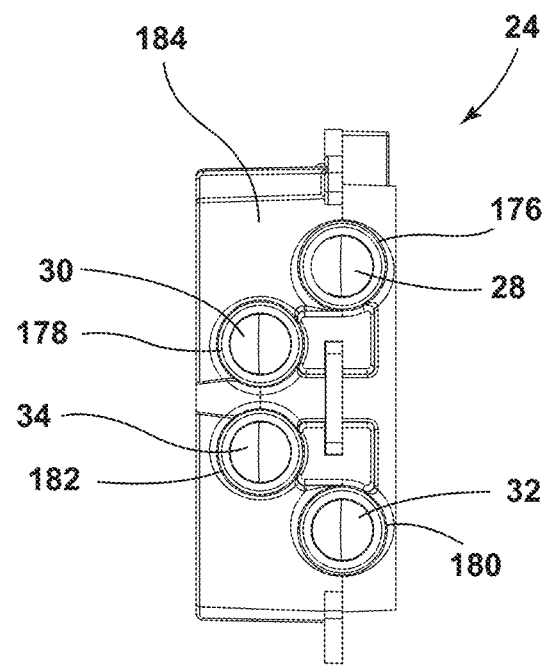
FIG. 10 is a side elevational view of a manifold core with outlet tubes arranged along a single side thereof, according to the present disclosure.

Referring still to FIG. 8, as well as to FIG. 10, the outlet tubes 176, 178, 180 182 are arranged along a single side 184 of the manifold core 24. Generally, the first and third outlet tubes 176, 180 are arranged as the outermost outlet tubes 176, 180 and are aligned with one another. As illustrated, the first and third outlet tubes 176, 180 are vertically aligned.

The second and fourth outlet tubes 178, 182 are arranged as the innermost outlet tubes 178, 182 and are aligned with one another. As illustrated, the second and fourth outlet tubes 178, 182 are vertically aligned. Generally, the first outlet tube 176 is in fluid communication with the first bladder 114 aligned with the right back region of the patient, and the second outlet tube 178 is in fluid communication with the second bladder 116 aligned with the right sacral region of the patient. Similarly, the third outlet tube 180 is in fluid communication with the third bladder 118 aligned with the left back region of the patient, and the fourth outlet tube 182 is in fluid communication with the fourth bladder 120 aligned with the left sacral region of the patient.

Figure 11:
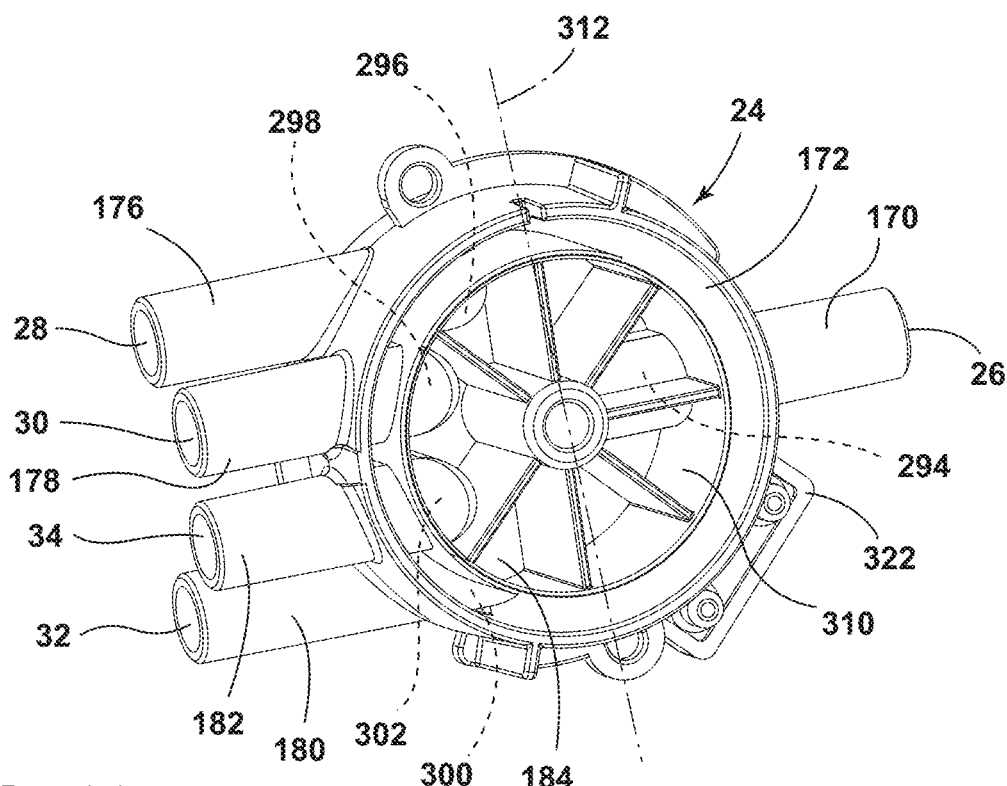
FIG. 11 is a side perspective view of a manifold core of a manifold assembly, according to the present disclosure.

Referring still to FIG. 8, as well as to FIG. 11, an inside 310 of the manifold core 24 that abuts the support member 214 is illustrated. The inlet tube 170 and the outlet tubes 176, 178, 180, 182 are on opposing sides 172, 184 of the manifold core 24. In the illustrated example, the inlet tube 170 and the outlet tubes 176, 178, 180, 182 extend partially into the inside 310 of the manifold core 24 but do not connect with one another inside the manifold core 24. The inlet tube 170 ends on a first side of the driveshaft aperture 282 of the manifold core 24 without crossing a centerline 312 of the manifold core 24. The outlet tubes 176, 178, 180, 182 end on a second opposing side of the driveshaft aperture 282 without crossing the centerline 312 of the manifold core 24. The connector 36 is utilized to fluidly couple the inlet tube 170 with the outlet tubes 176, 178, 180, 182 as described further herein.

Figure 12:
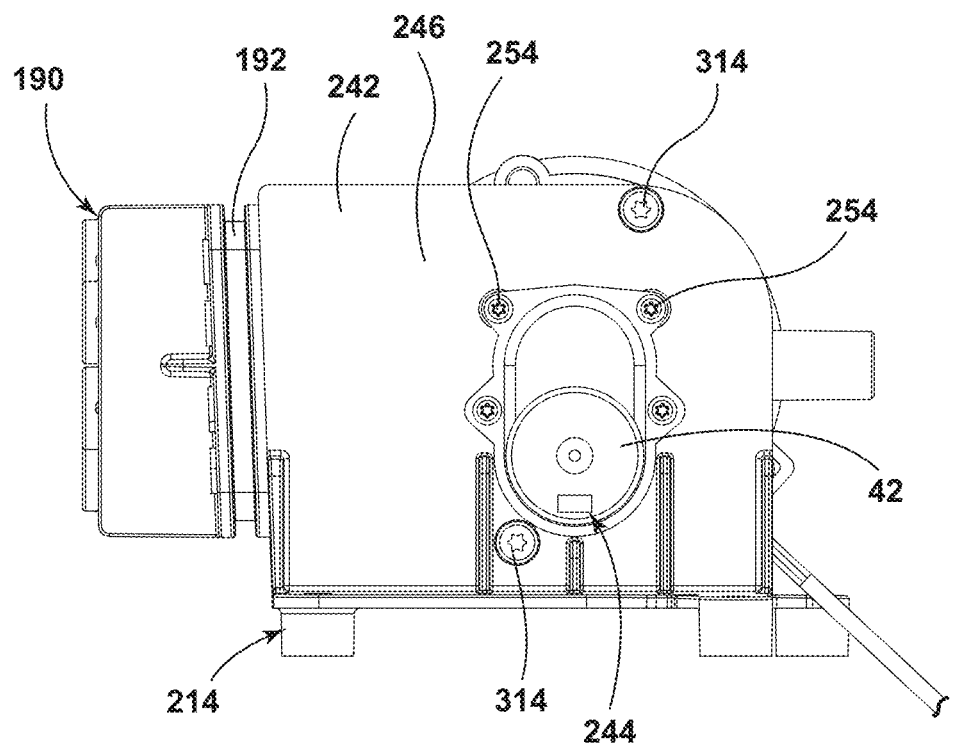
FIG. 12 is a side elevational view of a manifold assembly, according to the present disclosure.

Referring still to FIG. 8, as well as FIG. 12, the manifold core 24 may be fixedly coupled to the support member 214. In the illustrated configuration, two fasteners 314 are utilized to couple the manifold core 24 to the support wall 242. This engagement with the fasteners 314 assists in retaining the manifold core 24, as well as the connector 36, in position as the connector 36 rotates relative to the manifold core 24, as discussed further herein. Additionally or alternatively, the fasteners 314 may assist in locking the various components of the manifold assembly 22 into place relative to one another, which may increase the life cycle of the manifold assembly 22.

The motor assembly 244, the manifold core 24, and the connector 36 are all substantially disposed over the base 240, providing a compact assembly. The compact assembly reduces space utilized within the interior 18 of the mattress 16, providing more space for other features, such as the bladders 20. The outlet cap 190 extends beyond the support member 214 to extend through the side 194 of the housing 140. The support member 214 is generally disposed adjacent to the side 194 of the housing 140, with the rim 192 being slightly offset from an edge of the support member 214 to engage the housing 140.

Referring still to FIG. 8, the manifold assembly 22 includes an optical switch 320 coupled to the manifold core 24. The manifold core 24 has an extension 322 disposed adjacent to the engagement surface 280 of the manifold core 24, and the optical switch 320 may be coupled to the extension 322 via fasteners 324. The optical switch 320 is configured to sense a position of the connector 36 and communicate the position information to the electronics 132 in the control box 130 (FIG. 4).

As previously stated, the motor 42 may be an electric stepper motor 42 configured to adjust the connector 36 to certain predefined positions. While the stepper motor 42 may rotate the connector 36 to the predefined positions, the optical switch 320 may confirm or verify the position of the connector 36. The optical switch 320 provides confirmation of the position of the connector 36 to maximize efficiency of the airflow through the manifold core 24. Moreover, the optical switch 320 may provide a zero reference point for the connector 36.

The connector 36 is rotatably coupled to the manifold core 24. Generally, the engagement between the connector 36 and the manifold core 24 is an airtight engagement, which may be accomplished by using the sealant 202. Additionally, a biasing force of the biasing member 264 biases the manifold core 24 toward the connector 36 to assist in providing and maintaining this airtight engagement. The connector 36 is configured to rotate about a rotational axis 330, which extends substantially normal to a direction of fluid movement that extends through the manifold core 24, indicated by the arrows 230, 232. The position of the connector 36 determines which of the outlet-connecting apertures 286, 288, 290, 292 are in fluid communication with the inlet-connecting aperture 284 as described further herein. The connector 36 may have any practicable configuration for fluidly coupling the inlet 26 with at least one of the outlets 28, 30, 32, 34. The connector 36 may be a cover, a plate, a cap, a valve, a channeling valve, a disk, a valve disk, a valve, or any other feature that is configured to be adjusted by the motor assembly 244.

Figure 13:
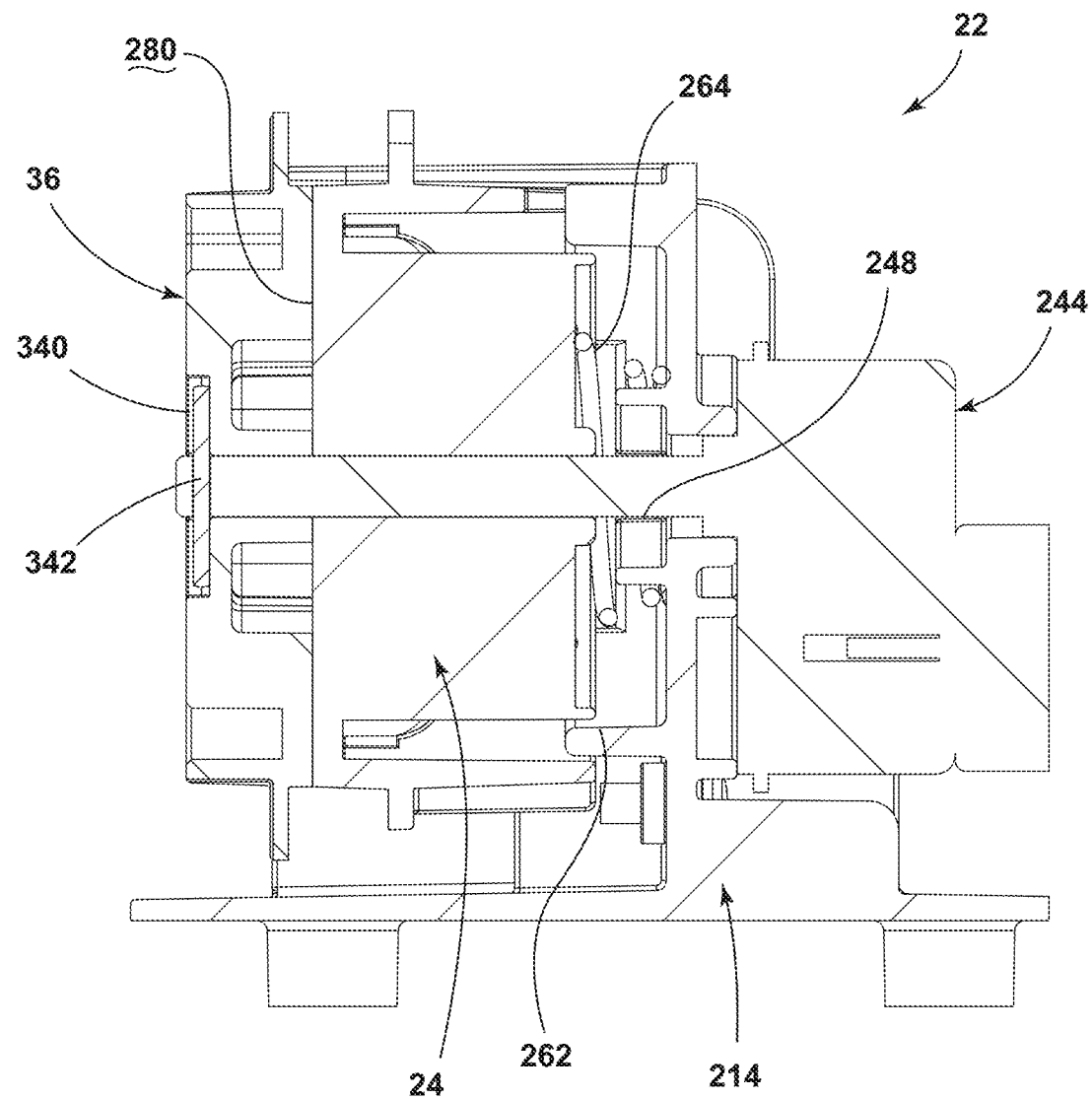
FIG. 13 is a cross-sectional view of a manifold assembly with a driveshaft extending through a manifold core and a connector, according to the present disclosure.

Referring still to FIG. 8, as well as FIG. 13, the driveshaft 248 of the motor assembly 244 extends through the support wall 242 of the support member 214, through the manifold core 24, and through the connector 36. The connector 36 has an outer side 332 that faces away from the manifold core 24. The outer side 332 defines a receiving portion 334 in a center thereof adjacent to or extending over a driveshaft aperture 336. The receiving portion 334 defines a groove 340. The groove 340 is sized and shaped to receive an end of a retaining pin 342. The retaining pin 342 extends through the driveshaft 248 and is positioned within the receiving portion 334 defined by the connector 36. The retaining pin 342 then retains the connector 36 to the driveshaft 248. Additionally, the retaining pin 342 is rotated by the driveshaft 248, which, consequently, causes rotation of the connector 36 by engaging the receiving portion 334.

The fasteners 314 coupling the manifold core 24 to the support member 214 assist in ensuring the retaining pin 342 remains in the receiving portion 334 of the connector 36. When the manifold assembly 22 is installed in the mattress 16 or in use, force on the manifold assembly 22 may adjust the position of the retaining pin 342 if the fasteners 314 are not used. The fasteners 314 assist in retaining the components in position relative to one another to reduce the possibility of the retaining pin 342 being removed or shifting from the receiving portion 334, which could affect the rotation of the connector 36 and, consequently, the function of the manifold assembly 22.

Figure 14:
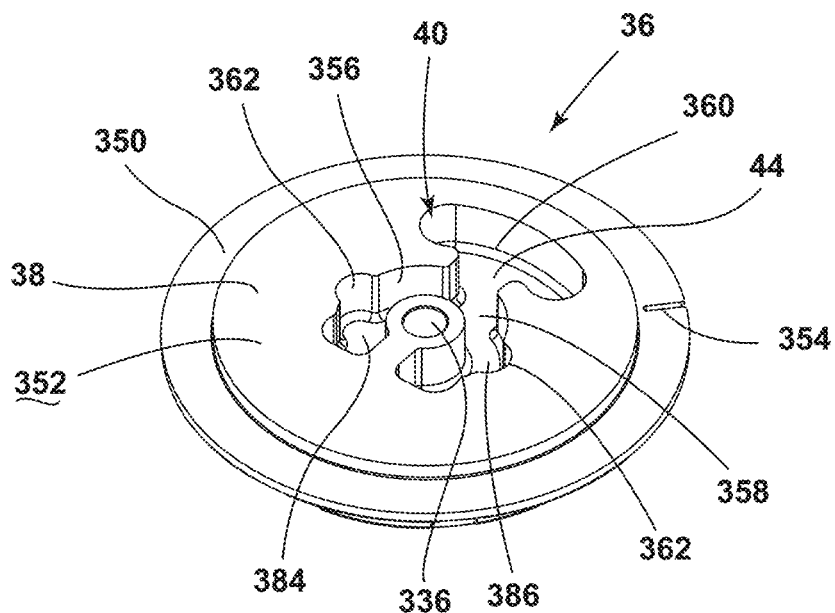
FIG. 14 is a side perspective view of an inner side of a manifold connector defining a recessed region for providing an airflow path, according to the present disclosure.
Figure 15:
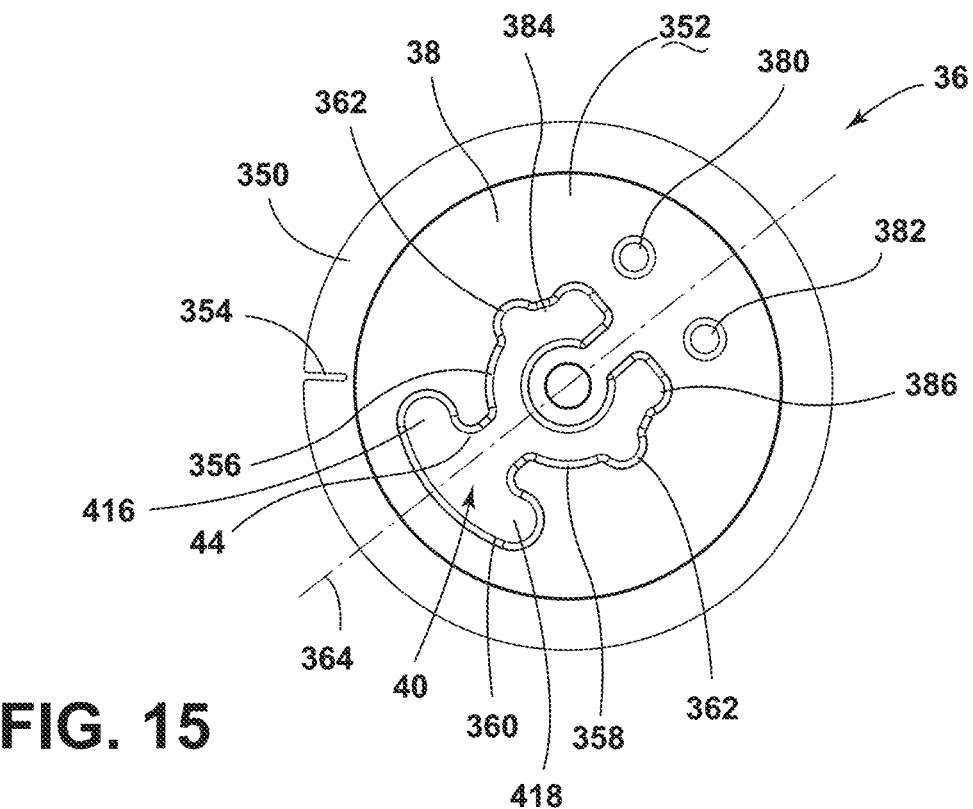
FIG. 15 is a top plan view of an inner side of a manifold connector defining a recessed region for providing an airflow path and defining release apertures, according to the present disclosure.

Referring to FIGS. 14 and 15, the connector 36 includes a flange 350 extending around a perimeter of the connector 36. The flange 350 is offset from an inner surface 352 on the inner side 38 of the connector 36. The flange 350 defines a notch 354, which may be utilized by the optical switch 320 to determine the position of the connector 36. Accordingly, the optical switch 320 may be configured to sense the position of the notch 354 to determine the position of the connector 36.

The inner side 38 of the connector 36 defines the recessed region 40, which is offset from a remainder of the inner surface 352 of the connector 36. The recessed region 40 defines a specific shape allowing for the selective fluid coupling of the inlet-connecting aperture 284 and one or more of the outlet-connecting apertures 286, 288, 290, 292. The recessed region 40 defines two leg portions 356, 358 extending from a connecting portion 360. The leg portions 356, 358 extend along opposing sides of the driveshaft aperture 336. Each leg portion 356, 358 includes a groove 362 generally aligned with the groove 362 of the other leg portion 356, 358. One side of the recessed region 40 is generally a mirror image across a central axis 364 of the connector 36. The recessed region 40 defines a space that provides the airflow passage 44 for fluidly coupling the inlet 26 and the outlets 28, 30, 32, 34 of the manifold core 24 as described further herein.

The outer side 332 of the connector 36 may have an irregular surface within an elevated portion 370, which corresponds to the recessed region 40 on the opposing inner side 38. The receiving portion 334 for the retaining pin 342 may be disposed on the elevated portion 370. A peripheral surface 372 on the outer side 332 surrounding the elevated portion 370 may be recessed or offset from the elevated portion 370. Supports 374 may extend outward from the elevated portion 370 to an edge 376 on the outer side 332 of the connector 36, providing additional support for the connector 36. It is also contemplated that the connector 36 may have a substantially flat outer surface such that the elevated portion 370 extends to the edge 376.

As illustrated in FIG. 15, in various aspects, the connector 36 defines release apertures 380, 382. The release apertures 380, 382 are defined proximate to ends 384, 386 of the leg portions 356, 358 on an opposing side of the connector 36 relative to the connecting portion 360 of the recessed region 40. The release apertures 380, 382 extend through the connector 36 and are configured to provide a path for fluid to be released from the pneumatic system 110 as described further herein.

Referring to FIGS. 16-24, the connector 36 is operable between a block position 400 and multiple connecting positions 402, 404, 406, 408. When the connector 36 is in the block position 400, fluid or air is prevented or blocked from traveling through the manifold core 24 to the bladders 20. Accordingly, in the block position 400, the inlet 26 and the outlets 28, 30, 32, 34 are not in fluid communication, and the bladders 20 are maintained in a current state. When the connector 36 is in any of the various connecting positions 402, 404, 406, 408, the connector 36 allows air to flow through the manifold core 24 and at least one of the bladders 20 to be adjusted to the deployed state or the non-deployed state.

Figure 16:
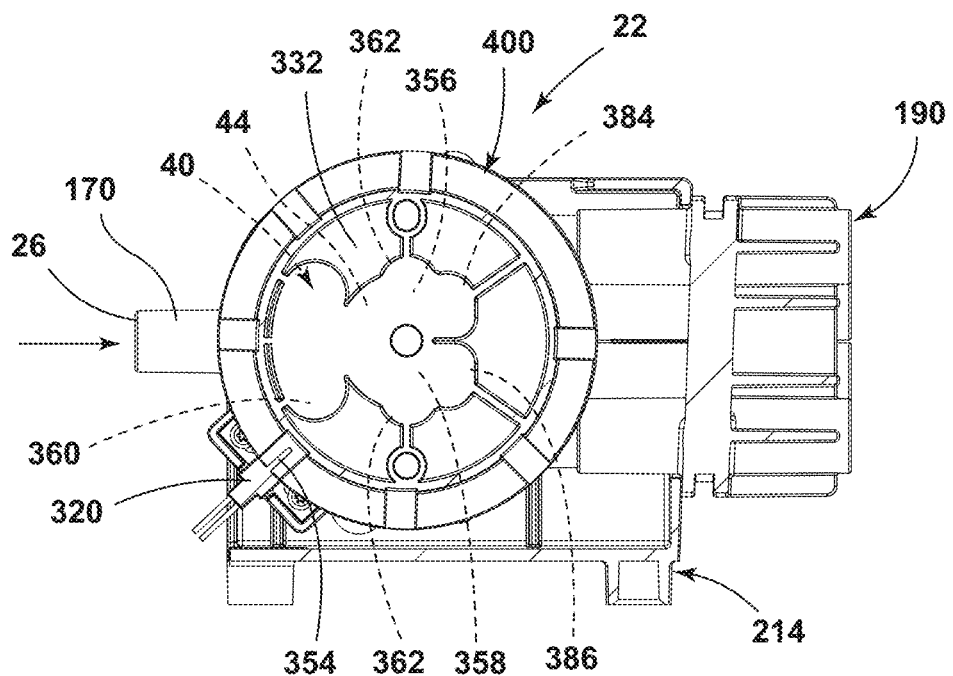
FIG. 16 is a side elevational view of a manifold assembly with a connector in a block position, according to the present disclosure.
Figure 17:
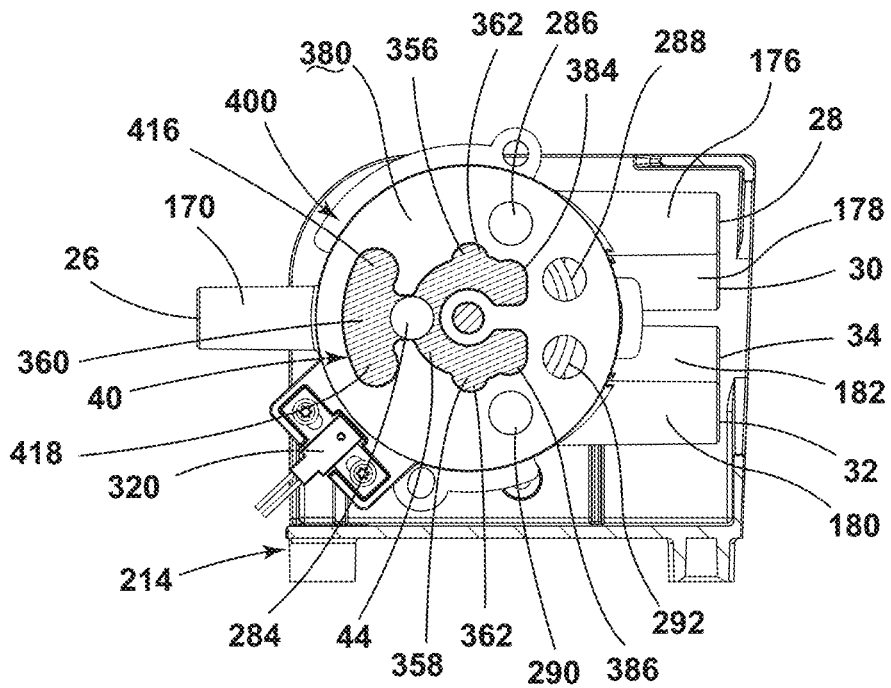
FIG. 17 is a side elevational view of the manifold assembly of FIG. 16 with a recessed region of the connector illustrated on an engagement surface of a manifold core, according to the present disclosure.

Referring still to FIGS. 16 and 17, the connector 36 is illustrated in the block position 400. The block position 400 may be an initial or default position that the connector 36 returns to at any given time. In the block position 400, the connector 36 prevents airflow from traveling through the manifold core 24. As best illustrated in FIG. 17, the shape of the recessed region 40 is illustrated relative to the engagement surface 280 of the manifold core 24. The connecting portion 360 of the recessed region 40 is disposed over the inlet-connecting aperture 284 allowing air from the inlet 26 to flow into the airflow passage 44. The airflow passage 44 is defined and substantially enclosed by the engagement surface 280 and recessed region 40 on the inner side 38 of the connector 36. However, based on the orientation of the connector 36, the recessed region 40 and, consequently, the airflow passage 44, are not disposed over any of the outlet-connecting apertures 286, 288, 290, 292. Therefore, air cannot flow through any of the outlet-connecting apertures 286, 288, 290, 292, thereby preventing fluid communication between the inlet 26 and any of the outlets 28, 30, 32, 34.

The block position 400 may be utilized to retain a current state of the bladders 20, whether the bladders 20 are in the deployed state or the non-deployed state by preventing airflow through the manifold core 24. Air is not directed into or out of the bladders 20 when the connector 36 is in the block position 400. As the block position 400 is a default position, depending on a selected function of the pneumatic system 110, the connector 36 may return to the block position 400 after being in any of the multiple connecting positions 402, 404, 406, 408. The block position 400 may be the zero reference point of the connector 36 sensed by the optical sensor.

Figure 18:
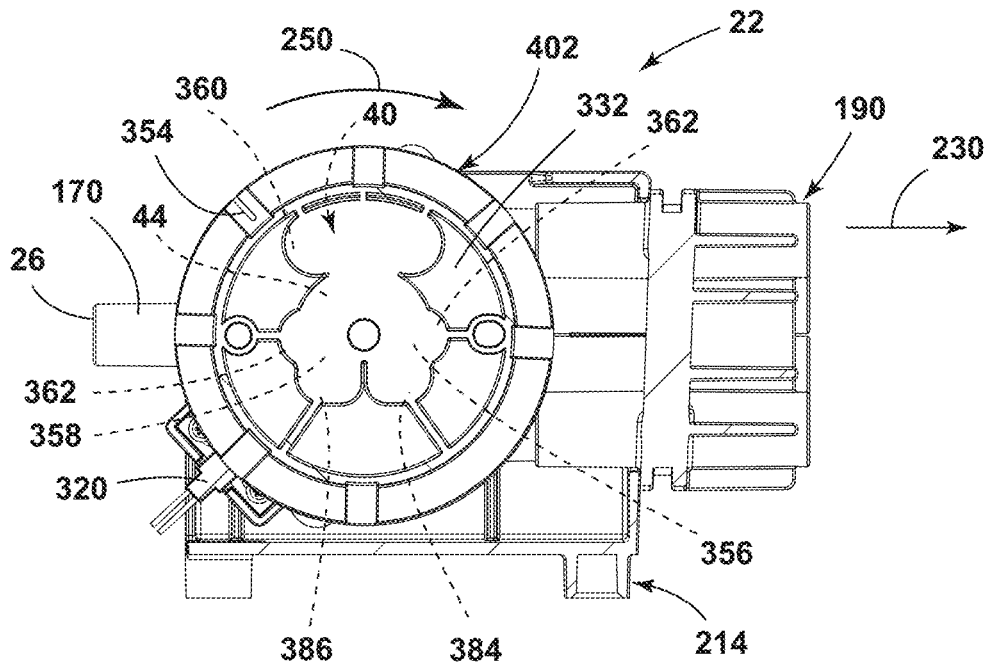
FIG. 18 is a side elevational view of a manifold assembly with a connector in a first connecting position fluidly coupling an inlet with one outlet, according to the present disclosure.
Figure 19:
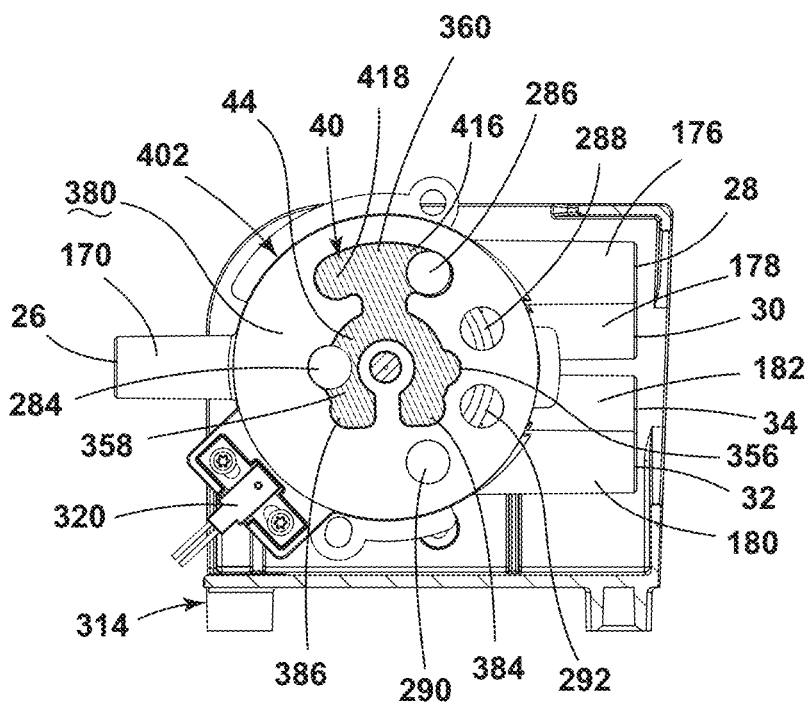
FIG. 19 is a side elevational view of the manifold assembly of FIG. 18 with a recessed region of the connector illustrated on an engagement surface of a manifold core, according to the present disclosure.

Referring to FIGS. 18 and 19, the connector 36 is illustrated in the first connecting position 402, which fluidly couples the inlet 26 with the first outlet 28. From the block position 400, the connector 36 rotates in the first direction 250 in a range between about 80 degrees and about 85 degrees relative to the block position 400. In certain aspects, the connector 36 may rotate about 82 degrees from the block position 400 to reach the first connecting position 402. Generally, rotation in the first direction 250 is in the positive or clockwise direction 250.

The rotation of the connector 36 changes the position of the airflow passage 44 relative to the engagement surface 280 of the manifold core 24. As illustrated in FIG. 19, the shape of the recessed region 40 in the first connecting position 402 is illustrated relative to the engagement surface 280 of the manifold core 24. In the first connecting position 402, a first side 416 of the connecting portion 360 of the recessed region 40 is disposed over the first outlet-connecting aperture 286, which is in fluid communication with the first outlet 28.

In this connecting position 402, the second leg portion 358 is disposed over the inlet-connecting aperture 284. The groove 362 of the second leg portion 358 may be advantageous for more fully aligning the recessed region 40 with the inlet-connecting aperture 284 to maximize airflow from the inlet-connecting aperture 284 into the airflow passage 44. In this way, the configuration of the recessed region 40 minimizes or prevents blocking of the inlet-connecting aperture 284. Air may travel through the inlet 26, through the inlet-connecting aperture 284, through the airflow passage 44 (i.e., along the second leg portion 358 and the connecting portion 360), through the first outlet-connecting aperture 286, and through the first outlet 28 to the first bladder 114.

When the connector 36 is in the first connecting position 402, the first bladder 114 may be adjusted to the deployed state, while the remaining bladders 116, 118, 120 are retained in their current state (e.g., deployed or non-deployed state). After the first bladder 114 is adjusted to the deployed state, the connector 36 may return to the block position 400, which prevents airflow through the manifold core 24. The prevention of airflow through the manifold core 24 allows the first bladder 114 to be maintained in the deployed state. The connector 36 may remain in the first connecting position 402 for a predefined period of time, until the bladder 114 reaches a predefined pressure, or a combination thereof. The predefined period of time or the predefined pressure may be sensed by an airflow sensor in the pneumatic system 110, a pressure sensor in the pneumatic system 110, etc.

The first bladder 114 may also be adjusted to the non-deployed state when the connector 36 is in the first connecting position 402. The air may passively flow from the bladder 114, through the manifold core 24, and through the blower 112. Alternatively, the blower 112 may be utilized to vacuum the air from the first bladder 114 to adjust the first bladder 114 to the non-deployed state. The air may be directed to or through the blower 112 and out of the housing 140.

Figure 20:
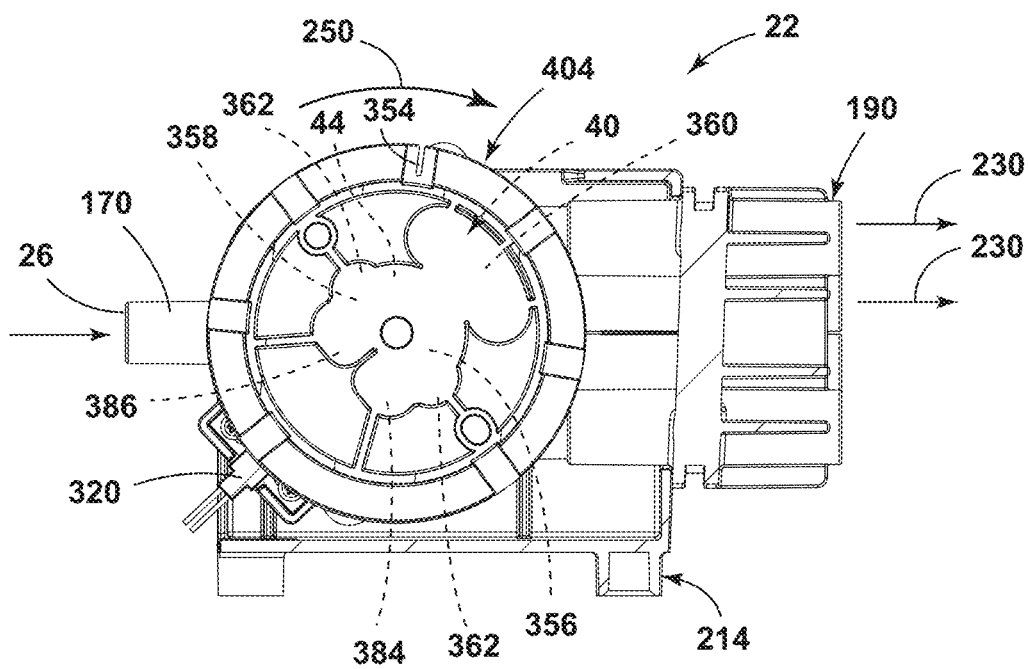
FIG. 20 is a side elevational view of a manifold assembly with a connector in a second connecting position fluidly coupling an inlet with two outlets, according to the present disclosure.
Figure 21:
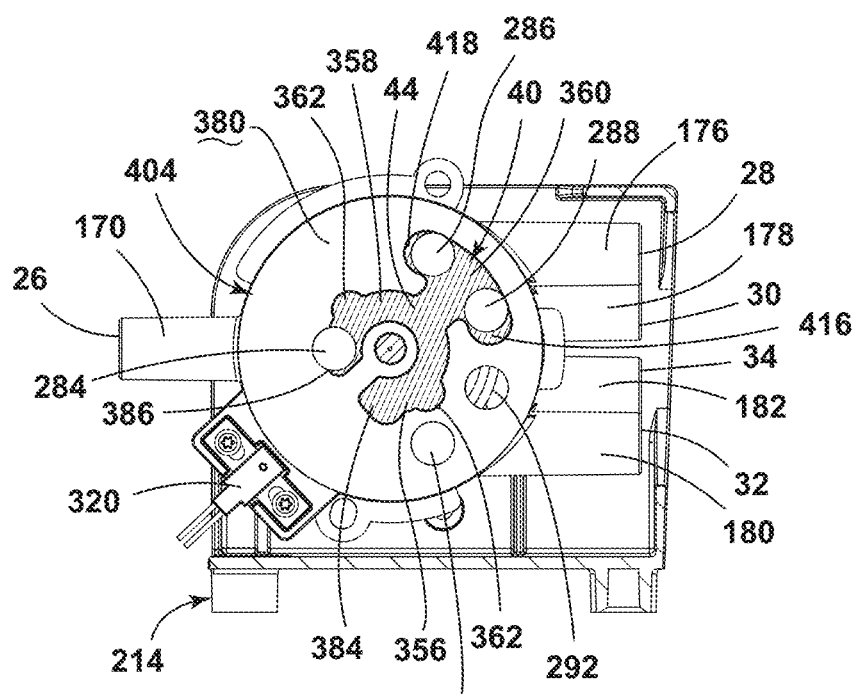
FIG. 21 is a side elevational view of the manifold assembly of FIG. 20 with a recessed region of the connector illustrated on an engagement surface of a manifold core, according to the present disclosure.

Referring to FIGS. 20 and 21, the connector 36 is illustrated in the second connecting position 404, which fluidly couples the inlet 26 with the first and second outlets 28, 30. The connector 36 is rotated in the first direction 250 in a range between about 120 degrees and about 130 degrees relative to the block position 400 (i.e., the zero reference point) to reach the second connecting position 404. In certain aspects, the connector 36 rotates about 126 degrees relative to the block position 400 to reach the second connecting position 404.

As illustrated in FIG. 21, the shape of the recessed region 40 in the second connecting position 404 is illustrated relative to the engagement surface 280 of the manifold core 24. In the second connecting position 404, the connecting portion 360 of the recessed region 40 extends over both the first outlet-connecting aperture 286 and the second outlet-connecting aperture 288. The first side 416 of the connecting portion 360 of the recessed region 40 is aligned with the second outlet-connecting aperture 288, and a second side 418 of the connecting portion 360 is aligned with the first outlet-connecting aperture 286. The end 386 of the second leg portion 358 is aligned with the inlet-connecting aperture 284.

In this way, air may travel through the inlet 26, through the inlet-connecting aperture 284, through the airflow passage 44, and through each of the first and second outlet-connecting apertures 286, 288 to adjust the first and second bladders 114, 116 to the deployed state. When the connector 36 is in the second connecting position 404, the first and second bladders 114, 116 may be adjusted to the deployed state, while the remaining bladders 118, 120 are retained in their current state (e.g., deployed or non-deployed state). To maintain the first and second bladders 114, 116 in the deployed state, the connector 36 may return to the block position 400 to retain the fluid in the first and second bladders 114, 116.

It is contemplated that the first and second bladders 114, 116 may also be adjusted to the non-deployed state when the connector 36 is in the second connecting position 404. The air may passively flow from the bladders 114, 116, through the manifold core 24, and through the blower 112, or the blower 112 may be utilized to vacuum the air from the first and second bladders 114, 116 to adjust the first and second bladders 114, 116 to the non-deployed state.

Referring again to FIGS. 22 and 23, the connector 36 is illustrated in the third connecting position 406, which fluidly couples the inlet 26 with the third outlet 32. When in the third connecting position 406, the connector 36 is rotated in the second direction 252 in a range between about 80 degrees and about 85 degrees relative to the block position 400. The second direction 252 is generally the negative or counterclockwise direction 252. As illustrated in FIG. 23, the shape of the recessed region 40 in the third connecting position 406 is illustrated relative to the engagement surface 280 of the manifold core 24. When in the third connecting position 406, the second side 418 of the connecting portion 360 of the recessed region 40 is aligned with the third outlet-connecting aperture 290, which is in fluid communication with the third outlet 32. In this position, the first leg portion 356 is disposed over the inlet-connecting aperture 284. The groove 362 may be advantageous for more fully aligning the recessed region 40 with the inlet-connecting aperture 284 to maximize airflow from the inlet-connecting aperture 284 into the airflow passage 44. The configuration of the recessed region 40 minimizes or prevents blocking of the inlet-connecting aperture 284.

Air may travel through the inlet 26, through the inlet-connecting aperture 284, through the airflow passage 44 (i.e., along the first leg portion 356 and the connecting portion 360), through the third outlet-connecting aperture 290, and through the third outlet 32 to the third bladder 118. When the connector 36 is in the third connecting position 406, the third bladder 118 may be adjusted to the deployed state, while the remaining bladders 114, 116, 120 are retained in their current state (e.g., deployed or non-deployed state). The connector 36 may return to the block position 400 to prevent air from being added or removed from the third bladder 118 and retain the fluid therein.

Additionally or alternatively, the third bladder 118 may also be adjusted to the non-deployed state when the connector 36 is in the third connecting position 406. The blower 112 may be utilized to vacuum the air from the third bladder 118 to adjust the third bladder 118 to the non-deployed state. Alternatively, the air may passively flow from the bladder 118, through the manifold core 24, and through the blower 112.

Figure 24:
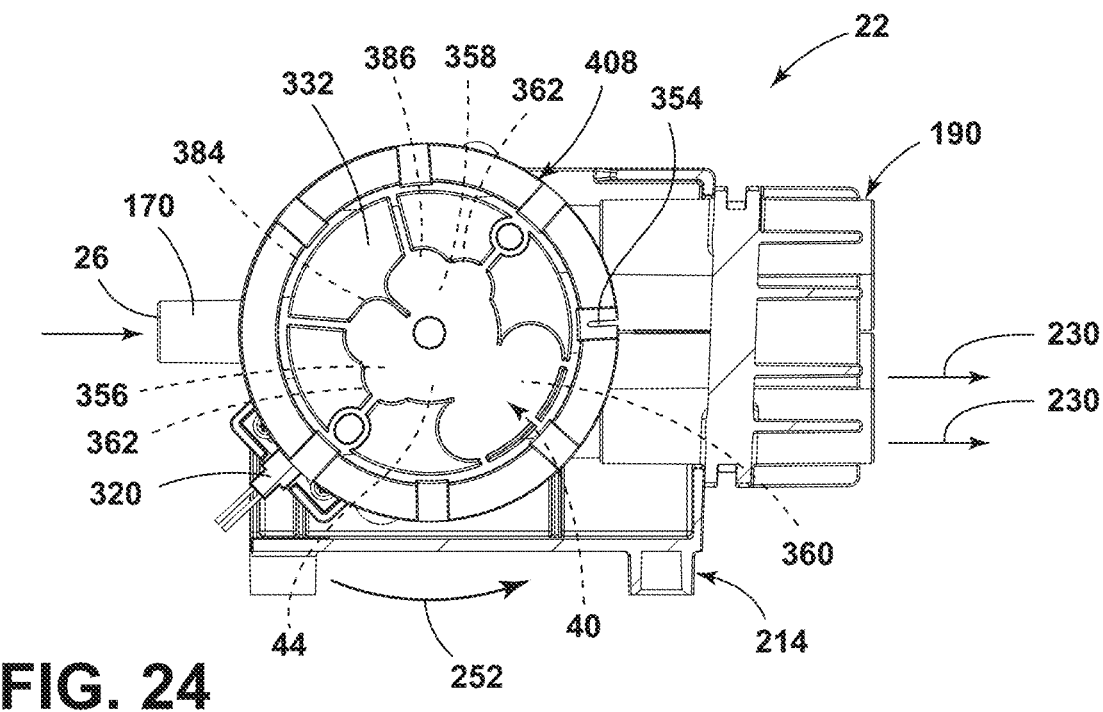
FIG. 24 is a side elevational view of a manifold assembly with a connector in a second connecting position fluidly coupling an inlet with two outlets, according to the present disclosure.
Figure 25:
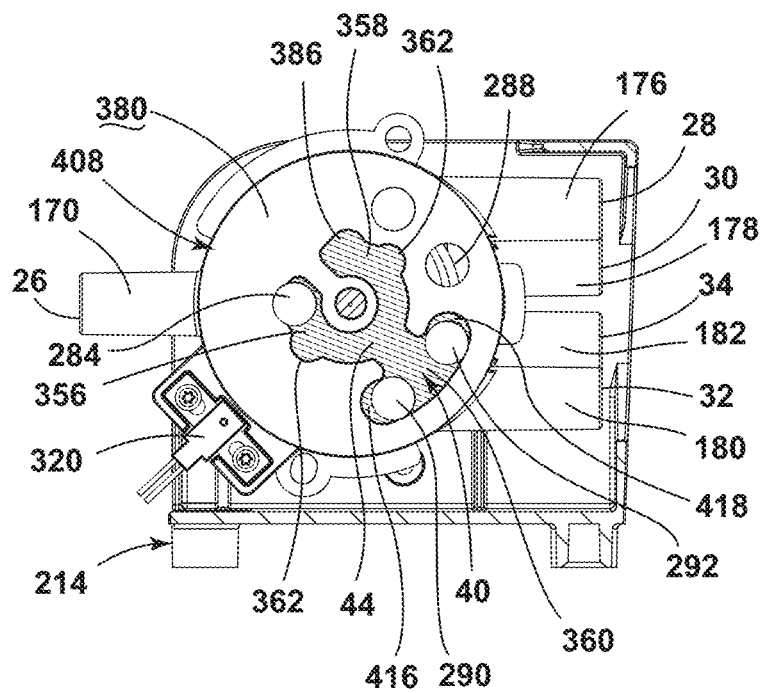
FIG. 25 is a side elevational view of the manifold assembly of FIG. 24 with a recessed region of the connector illustrated on an engagement surface of a manifold core, according to the present disclosure.

Referring to FIGS. 24 and 25, the connector 36 is illustrated in the fourth connecting position 408, which fluidly couples the inlet 26 with the third and fourth outlets 32, 34. The connector 36 is generally rotated in the second direction 252 in a range between about 120 degrees and about 130 degrees relative to the block position 400. In certain aspects, the connector 36 rotates about 126 degrees relative to the block position 400 to reach the fourth connecting position 408.

As illustrated in FIG. 25, the shape of the recessed region 40 in the fourth connecting position 408 is illustrated relative to the engagement surface 280 of the manifold core 24. In the fourth connecting position 408, the connecting portion 360 of the recessed region 40 extends over both the third outlet-connecting aperture 290 and the fourth outlet-connecting aperture 292. The first side 416 of the connecting portion 360 is aligned with the third outlet-connecting aperture 290, and the second side 418 of the connecting portion 360 is aligned with the fourth outlet-connecting aperture 292. The end 384 of the first leg portion 356 is aligned with the inlet-connecting aperture 284.

In this configuration, air may travel through the inlet 26, through the inlet-connecting aperture 284, through the airflow passage 44, and through the third and fourth outlet-connecting apertures 290, 292 to adjust the third and fourth bladders 118, 120 to the deployed state. When the connector 36 is in the fourth connecting position 408, the third and fourth bladders 118, 120 may be adjusted to the deployed state, while the remaining bladders 114, 116 are retained in their current state (e.g., deployed or non-deployed state). To maintain the third and fourth bladders 118, 120 in the deployed state, the connector 36 may return to the block position 400 to retain the fluid in the third and fourth bladders 118, 120.

It is contemplated that the third and fourth bladders 118, 120 may also be adjusted to the non-deployed state when the connector 36 is in the fourth connecting position 408. The air may passively flow from the third and fourth bladders 118, 120, through the manifold core 24, and through the blower 112. Alternatively, the blower 112 may be utilized to vacuum the air from the third and fourth bladders 118, 120 to adjust the third and fourth bladders 118, 120 to the non-deployed state.

Referring to FIGS. 16-25, each of the connecting positions 402, 404, 406, 408 may be utilized to adjust the respective bladders 20 between the deployed and non-deployed states. The connector 36 may return to the block position 400 to maintain the current state of each of the bladders 20. Alternatively, the connector 36 may remain in the respective connecting position 402, 404, 406, 408 while maintaining the corresponding bladders 20 in the select state. The deployed state may be a fully inflated condition or a partially inflated condition. Whether the fully inflated condition or partially inflated condition is used depends on various factors, for example, which protocol of the pneumatic system 110 is activated or an amount of pressure to be applied to the patient. Further, when in the inflated condition, the connector 36 may be adjusted to at least one of the connecting positions 402, 404, 406, 408 and the bladders 20 may be adjusted to a less inflated condition or fully to a deflated condition. The air may be released from the bladders 20 actively, passively, or in a combination thereof. When in the deflated condition, it is contemplated that some air may remain in the bladders 20 without departing from the teachings herein. The air level in the bladders 20 in the deflated condition may not apply substantial pressure to the patient.

Referring to FIGS. 26-30, with various configurations of the connector 36, the connector 36 may also be operable between multiple release positions 430, 432. The connecting positions 402, 404, 406, 408 may be utilized to adjust the bladders 20 to the deployed state and to maintain the bladders 20 in the current state. The release positions 430, 432 may be utilized to release air from at least one bladder 20. In this way, the release positions 430, 432 may adjust at least one bladder 20 to the deflated condition or to a lesser inflated condition. Further, the release positions 430, 432 may be advantageous for more fully releasing or venting air from the bladders 20, for example, when a certain amount of air remains and the bladders 20 are in the non-deployed state. The venting may maximize the pressure difference between the various bladders 20.

Figure 26:
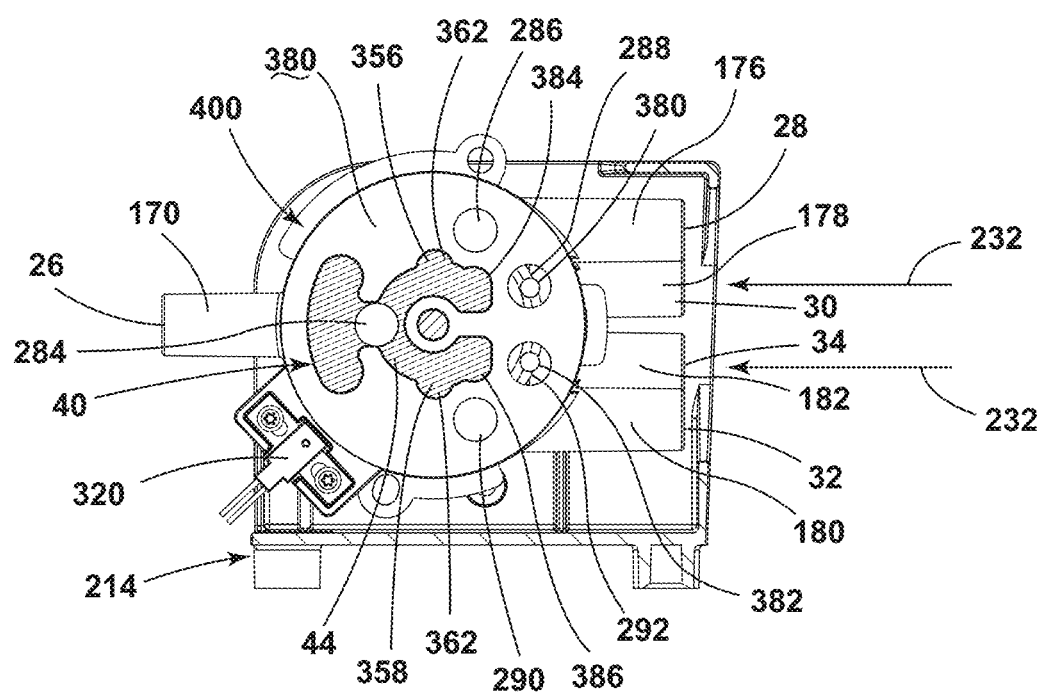
FIG. 26 is a side elevational view of a manifold assembly with a recessed region of a connector illustrated on an engagement surface of a manifold core with the connector in a block position and release apertures in fluid communication with two outlets, according to the present disclosure.

In the illustrated example, the connector 36 includes the two release apertures 380, 382 as described with respect to FIG. 15. The release apertures 380, 382 may align with any of the outlet-connecting apertures 286, 288, 290, 292 to release the air from the corresponding bladders 20. For example, as illustrated in FIG. 26, when the connector 36 is in the block position 400, the release apertures 380, 382 are aligned with the second and fourth outlet-connecting apertures 288, 292. Accordingly, when in the block position 400, air may not be directed into any of the bladders 20, but air may be released from the second and fourth bladders 116, 120.

Figure 27:
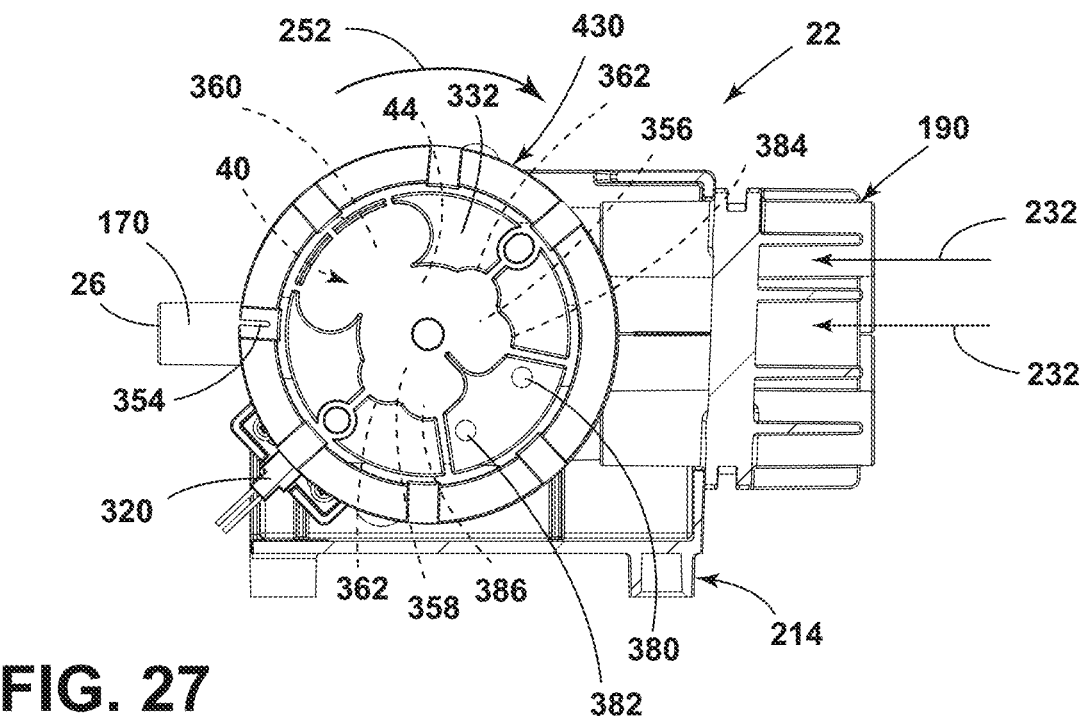
FIG. 27 is a side elevational view of a manifold assembly with a connector in a first release position, according to the present disclosure.
Figure 28:
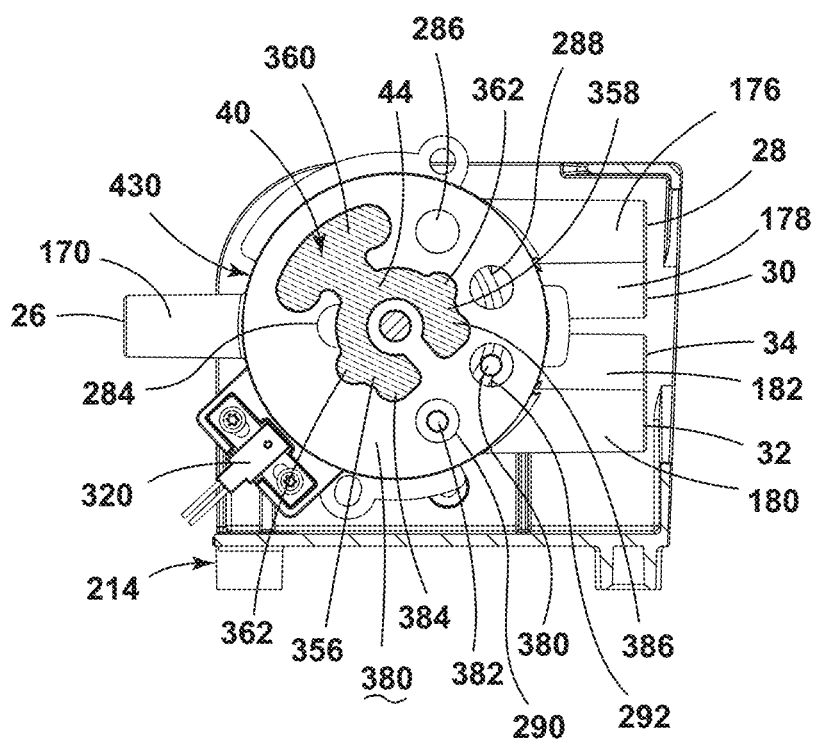
FIG. 28 is a side elevational view of the manifold assembly of FIG. 27 with a recessed region and release aperture of the connector illustrated on an engagement surface of a manifold core, according to the present disclosure.
Figure 29:
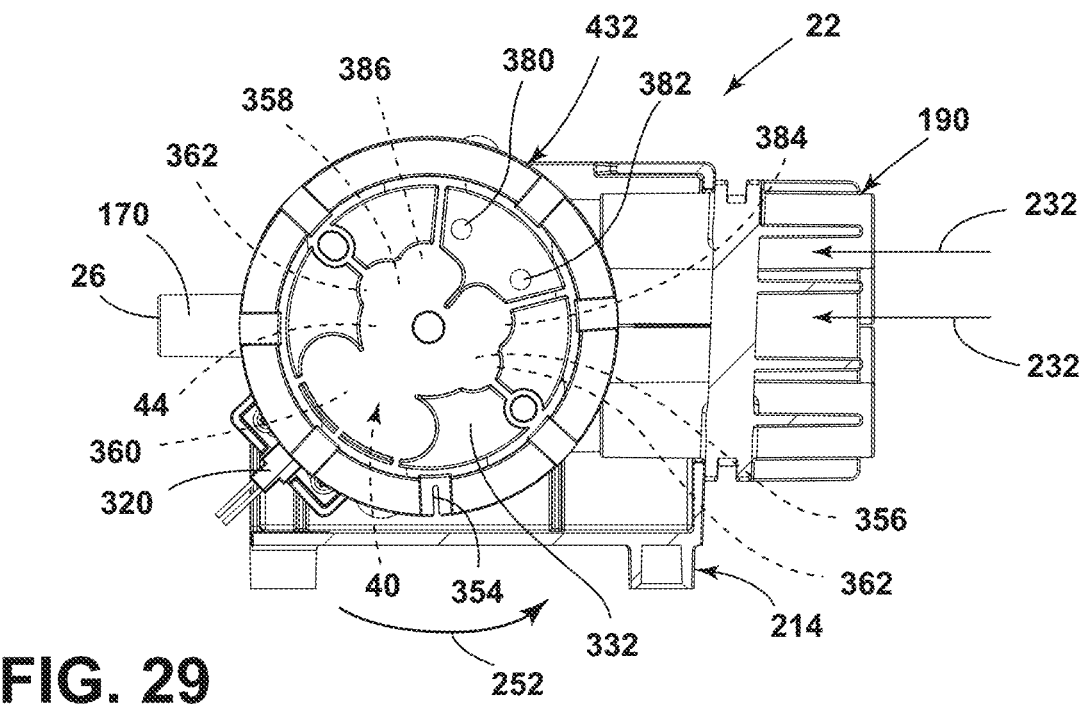
FIG. 29 is a side elevational view of a manifold assembly with a connector in a second release position, according to the present disclosure.

The connector 36 with the release apertures 380, 382 may also be operable between additional release positions 430, 432, as illustrated in FIGS. 27 and 29. The release positions 430, 432 illustrated in FIGS. 27 and 29 may not align with any other position (e.g., the block position 400 or the connecting positions 402, 404, 406, 408). To reach the first release position 430, as illustrated in FIGS. 26 and 28, the connector 36 rotates in the first direction 250 in a range between about 40 degrees and about 50 degrees from the block position 400. In certain aspects, the connector 36 rotates about 45 degrees in the first direction 250 from the block position 400.

As illustrated in FIGS. 27 and 28, the outline of the recessed region 40 and the release apertures 380, 382 in the first release positions 430 are illustrated relative to the engagement surface 280 of the manifold core 24. The recessed region 40 partially aligns with the inlet-connecting aperture 284 and does not align with any of the outlet-connecting apertures 286, 288, 290, 292. Accordingly, airflow through the manifold core 24 in the first direction, as illustrated by arrow 230, is prevented. The release apertures 380, 382 are aligned with the third and fourth outlet-connecting apertures 290, 292, allowing air to release from the third and fourth bladders 118, 120. Further, the first and second bladders 114, 116 remain in the current state (e.g., deployed or non-deployed).

Figure 30:
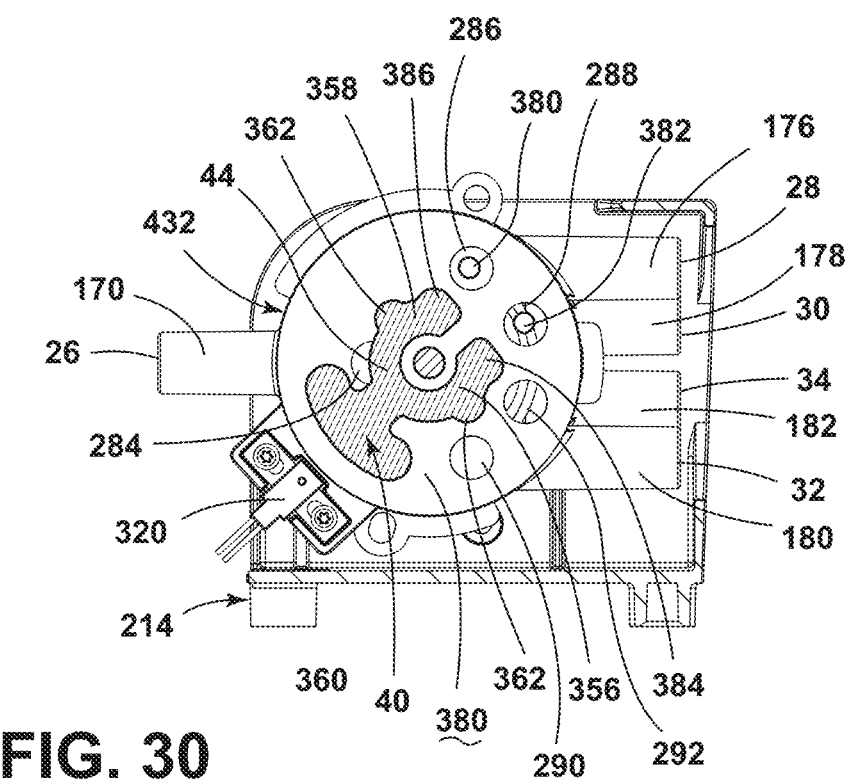
FIG. 30 is a side elevational view of the manifold assembly of FIG. 29 with a recessed region and release apertures of the connector illustrated on an engagement surface of a manifold core, according to the present disclosure.

As illustrated in FIGS. 29 and 30, to reach the second release position 432, the connector 36 rotates in the second direction 252 in a range between about 40 degrees and about 50 degrees from the block position 400. In certain aspects, the connector 36 rotates about 45 degrees in the second direction 252 from the block position 400. The release apertures 380, 382 align with the first and second outlet-connecting apertures 286, 288, allowing air to be released from the first and second bladders 114, 116. When in the second release positions 432, the third and fourth bladders 118, 120 are maintained in the current state, as the airflow passage 44 does not fluidly couple the inlet-connecting aperture 284 with any of the outlet-connecting apertures 286, 288, 290, 292.

The amount of time the connector 36 is in the block position 400, the first release position 430, or the second release position 432, determines how much fluid is released from the respective bladders 20. For example, if the pressure in a selected bladder 20 is to be lowered but the bladder 20 is to remain at least partially inflated, the air may be released through the release apertures 380, 382 for a shorter predefined period of time. If the selected bladder 20 is to be adjusted to the non-deployed state, the air may be released through the release apertures 380, 382 for a longer period of time. The connector 36 may then be adjusted so the release apertures 380, 382 do not align with any bladders 20 or the select bladders 20.

Referring again to FIGS. 16-30, the connector 36 with the release apertures 380, 382 may provide for combination positions that allow selected bladders 20 to be adjusted to the deployed state while air is released from other bladders 20. For example, when the connector 36 is in the first connecting position 402, as illustrated in FIGS. 18 and 19, the inlet 26 is fluidly coupled with the first outlet 28. Additionally, one of the release apertures 380 is aligned with the third outlet-connecting aperture 290. Accordingly, the first bladder 114 may be adjusted to the deployed state while the third bladder 118 has air released therefrom.

Figure 22:
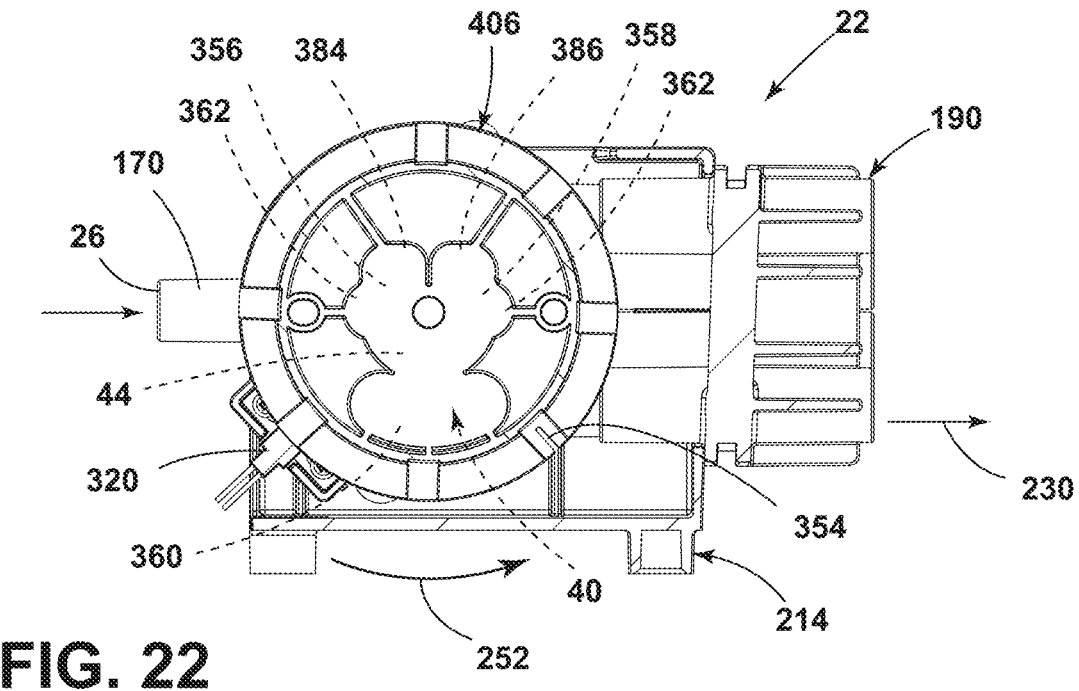
FIG. 22 is a side elevational view of a manifold assembly with a connector in a third connecting position fluidly coupling an inlet with one outlet, according to the present disclosure.
Figure 23:
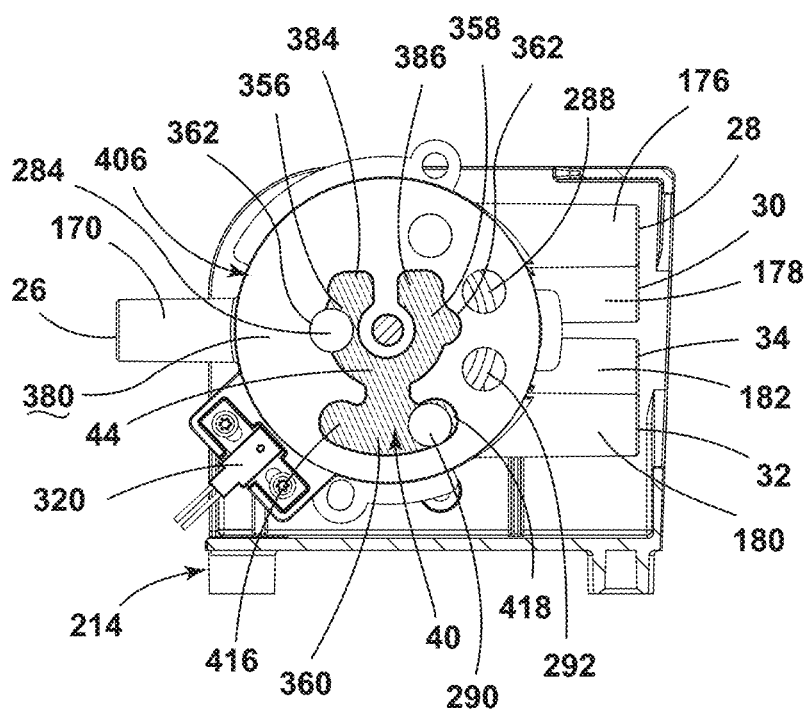
FIG. 23 is a side elevational view of the manifold assembly of FIG. 22 with a recessed region of the connector illustrated on an engagement surface of a manifold core, according to the present disclosure.

Additionally, when the connector 36 is in the third connecting position 406, as illustrated in FIGS. 22 and 23, one of the release apertures 382 is aligned with the first outlet-connecting aperture 286. Additionally, the inlet 26 is in fluid communication with the third outlet 32. The third bladder 118 may be adjusted to the deployed state while air is released from the first bladder 114. It is contemplated that the connector 36 may include the release apertures 380, 382 at other locations or in configurations. In such examples, different combinations of bladders 20 may have air released simultaneously or other combinations may be inflated and deflated simultaneously.

The motor 42 and the optical switch 320 may be utilized to adjust the position of the connector 36 to maximize airflow through the airflow passage 44. The motor 42 may provide precision within about two to about five degrees of the angle of the various positions of the connector 36 set forth herein. In certain aspects, the motor 42 may provide precision of about +/−2 degrees of the angle for each respective position. The precision in the position of the connector 36 maximizes efficiency when adjusting the bladders 20 while minimizing air leakage. It is contemplated that the pneumatic system 110 may have a tolerance for operating at less precision without significant or any performance loss. For example, the manifold assembly 22 may support an angular position within a range of about five degrees to about ten degrees from the selected angle of the various positions. In certain aspects, the manifold assembly 22 may support the connector 36 in a selected position +/−6 degrees without significant performance loss.

Referring still to FIGS. 16-30, the angular position of the various positions of the connector 36 may be calculated based on a variety of factors. For example, the angular positions may account for dispersion of the motor 42, the configuration of the retaining pin 342, the relationship between the retaining pin 342 and the connector 36, and the rotation of the connector 36. The angular positions may be adjusted based on the configuration of the connector 36 for maximizing airflow through the manifold assembly 22. When adjusted, the positions may be monitored by the motor 42, the optical switch 320, or a combination thereof.

In various examples, the connector 36 may be adjusted at multiple different speeds. The connector 36 may rotate at a first speed until the connector 36 is at a predefined position relative to the selected connecting position 402, 404, 406, 408 or release position 430, 432. The predefined position may be a predefined distance or angle from the selected position. For the remaining rotation between the predefined position and the selected position, the connector 36 may rotate at a second speed, which is generally slower than the first speed. This configuration may be advantageous for quickly adjusting the connector 36 toward the selected position and then slowing the connector 36 as the connector 36 approaches the selected position before the connector 36 stops rotating.

For example, the connector 36 may be rotated at the first speed to the predefined position, which may be about 5 degrees to about 15 degrees from the selected position, and then may rotate at the second speed. In certain aspects, the first speed may be a maximum speed with a speed in a range between about 60 rpm and 65 rpm and the second speed may be about 30% of the maximum speed (e.g., between about 20 rpm and about 25 rpm). The connector 36 may also move at two different speeds when adjusting to the block position 400 in a similar manner. Alternatively, the connector 36 may rotate at a single speed without departing from the teachings herein.

Generally, each bladder 20 may be adjusted from the fully deflated condition to the fully inflated condition in a range of about 30 seconds to about 40 seconds. Each bladder 20 may also be adjusted from the fully inflated condition to the fully deflated position in a range between about 30 seconds and about 40 seconds. The deflation time may be accomplished when passively releasing air through the blower 112, possibly releasing air via the release positions 430, 432 of the connector 36, or actively vacuuming air through the blower 112. In certain aspects, each bladder 20 adjusts from the fully deflated condition to the fully inflated condition and from the fully inflated condition to the fully deflated condition in about 35 seconds.

Figure 31:
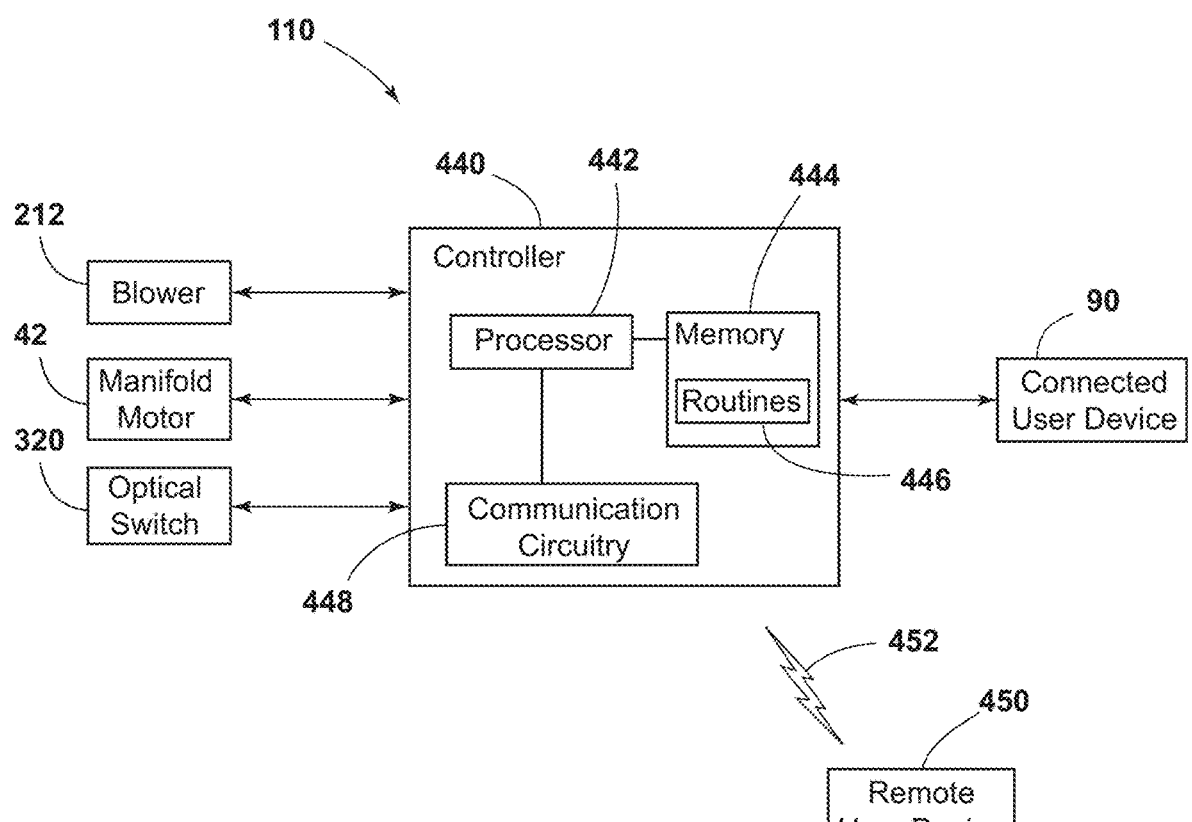
FIG. 31 is a block diagram of a pneumatic system, according to the present disclosure.

Referring to FIG. 31, the pneumatic system 110 includes a controller 440 communicatively coupled to the motor assembly 244, the blower 112, and the optical switch 320. The controller 440 includes a processor 442, a memory 444, and other control circuitry. Instructions or routines 446 are stored within the memory 444 and executable by the processor 442. At least one routine 446 relates to control of the rotation of the connector 36. Additionally or alternatively, at least one routine 446 may relate to adjusting various parameters of the pneumatic system 110 as described further herein. The control circuitry may include communication circuitry 448 for bidirectional communication via wired or wireless communication protocols.

The caregiver may control the pneumatic system 110 through the connected user device 90 coupled to the support apparatus 10 (FIG. 1). The controller 440 may receive user input from the connected user device 90 and activate at least one of the blower 112 and the motor assembly 244 to adjust the bladders 20. Depending on the user input, at least one of the bladders 20 may be at least partially inflated or at least partially deflated. The user input may relate to activating a selected therapy. When a selected therapy is activated, the bladders 20 may be adjusted in a predefined pattern, resulting from continued adjustment of the connector 36 between the corresponding positions 402, 404, 406, 408, 430, 432.

The controller 440 may also monitor the position of the connector 36 from a signal received from the optical switch 320. The connector 36 is generally adjusted to one of the connecting positions 402, 404, 406, 408 or the release positions 430, 432 via the motor assembly 244 in response to the user input or the selected therapy. Each of these connecting positions 402, 404, 406, 408 and release positions 430, 432 are a predefined position where the connector 36 is at a predefined angle or within a predefined range relative to the block position 400. The motor 42 is configured to adjust the connector 36 to each of these predefined angles. The motor 42 is in communication with the controller 440 and may communicate when the connector 36 is at the predefined angle. The optical switch 320 may be used to confirm the position of the connector 36. If the optical sensor senses that the connector 36 is not at the predefined angle, the optical switch 320 may communicate a signal to the controller 440, which may alert the caregiver.

Additionally or alternatively, the optical switch 320 may communicate when the connector 36 is not fully aligned with the block position 400. After the bladders 20 are adjusted based on the user input or the selected therapy, the connector 36 may return to the block position 400 to retain the current state of the bladders 20. If the position communicated by the motor 42 does not align with the position sensed by the optical switch 320, the controller 440 may alert the caregiver. The manifold assembly 22 may then be adjusted by the caregiver or a technician.

Referring still to FIG. 31, the user input may relate to certain continuous or periodic therapy protocols for treatments for the patient. The connector 36 may be continuously or periodically adjusted between the connecting positions 402, 404, 406, 408, the release positions 430, 432, the block position 400, or a combination thereof to provide the selected adjustment pattern of the bladders 20 based on the therapy protocol. The connector 36 may be adjusted to the block position 400 in between each adjustment to the connecting positions 402, 404, 406, 408 or the release positions 430, 432, or alternatively, may be adjusted directly between connecting positions 402, 404, 406, 408 or release positions 430, 432 without stopping in the block position 400.

Referring again to FIGS. 1-31, the pneumatic system 110 may be utilized to provide various therapies to the patient on the support apparatus 10. For example, the pneumatic system 110 may be used for continuous lateral rotation therapy. The bladders 20 may be inflated and deflated in a certain pattern to provide a gentle, side-to-side movement to the patient to aid in the prevention and treatment of pulmonary and other health complications related to immobility.

In the illustrated configuration, the first and third bladders 114, 118 are arranged under the torso of the patient and operate to turn the torso along the longitudinal axis 126 in response to the inflation of one of the first and third bladders 114, 118. The second and fourth bladders 116, 120 are arranged under a sacral region of the patient and operate to turn the legs of the patient along the longitudinal axis 126 in response to inflation of one of the second and fourth bladders 116, 120. The first and second bladders 114, 116 are arranged under the right side of the patient while the third and fourth bladders 118, 120 are arranged under the left side of the patient.

To rotate the patient to the right, the third and fourth bladders 118, 120 (i.e., the second pair 124) are inflated, while the first and second bladders 114, 116 (i.e., the first pair 122) may remain deflated or have additional air released or vented therefrom. To rotate the patient to the left, the first and second bladders 114, 116 are inflated, while the third and fourth bladders 118, 120 remain deflated or have additional air released or vented therefrom. In certain aspects, the first and second bladders 114, 116 may be inflated to turn the patient to the left and then may be deflated to turn the patient to a center position. The third and fourth bladders 118, 120 may then be inflated to turn the patient to the right. Accordingly, the bladders 20 may operate to adjust the patient between the center position, in which the patient is lying on his or her back, and lateral positions, in which the patient is lying on his or her right or left side. To provide this continuous lateral rotation therapy, the connector 36 may repeatedly be adjusted between the second connecting position 404 and the fourth connecting position 408. The connector 36 may be adjusted directly from the second connecting position 404 to the fourth connecting position 408 and back.

Additionally or alternatively, the connector 36 may be adjusted to the block position 400 between the second connecting position 404 and the fourth connecting position 408. In an additional non-limiting example, the connector 36 may be adjusted to the second connecting position 404 to inflate the first and second bladders 114, 116 and then to the second release position 432 to deflate the first and second bladders 114, 116. In such examples, the connector 36 may then be adjusted to the fourth connecting position 408 to inflate the third and fourth bladders 118, 120, and then the first release positions 430 to deflate the third and fourth bladders 118, 120. The connector 36 may return to the block position 400 between the second connecting position 404 and the second release position 432, as well as between the fourth connecting position 408 and the first release position 430. In such configurations, the respective bladders 20 may be maintained in the inflated condition for a predefined period of time before being deflated. It is also contemplated that the connector 36 may adjust from the connecting position 404, 408 to inflate the respective bladders 20, to the block position 400, and back to the respective connecting position 404, 408 to deflate the bladders 20 passively or actively.

The controller 440 may control the pneumatic system 110 to vary a number of turns, a pause time in each turn, a duration of the continuous lateral rotation therapy, etc. to provide customized treatment to the patient. The amount of pressure provided by each bladder 20 may be set by the caregiver or may be in response to information about the patient, such as, for example, weight of the patient.

Referring still to FIGS. 1-31, the pneumatic system 110 may also be utilized for providing turn assist for the caregiver. The controller 440 may include turn assist protocol, which is activated to assist the caregiver in turning the patient on the support apparatus 10 for linen changes, dressing changes, bedpan placement, back care, and other procedures or treatments. When the turn assist protocols are activated, some or all of the bladders 20 in the mattress 16 are adjusted. For example, when the patient is to be turned to his or her right side, the bladders 20 on the left side of the mattress 16 (i.e., the second pair 124 including the third and fourth bladders 118, 120) may inflate, consequently rotating the patient. In such examples, the bladders 20 on the right side may remain in a current state (e.g., neither inflate nor deflate) or may have air released to further contribute to the rotation of the patient.

In the example of turning the patient to the right side, the connector 36 may be adjusted to the fourth connecting position 408 to allow the third and fourth bladders 118, 120 to inflate. The connector 36 may then remain in the fourth connecting position 408 or return to the block position 400 to maintain the inflated condition of the third and fourth bladders 118, 120. Additionally or alternatively, the connector 36 may rotate to the second release position 432, to release any air that may have been in the first and second bladders 114, 116. It is also contemplated that the third bladder 118 may be adjusted independently based on the turn assist protocol. In such examples, the caregiver may rotate an upper body of the patient and not the entire body of the patient. To adjust the patient to the left side, the connector 36 is adjusted to the second connecting position 404 to inflate the first and second bladders 114, 116 or the first connecting position 402 to inflate the first bladder 114.

In various examples, certain conditions of patient support apparatus 10 may be met before the turn assist protocol is initiated. For example, the siderails 82, 84, 86, 88 in the direction the patient is to be turned may be raised before the turn assist protocol is initiated. In such configurations, an alert may be provided to the caregiver if the condition is not met prior to the attempted activation of the turn assist protocol.

Referring still to FIGS. 1-31, in addition to the continuous lateral rotation therapy, other lateral pressure redistribution may be provided by the pneumatic system 110. For example, the first bladder 114 or the third bladder 118 under the back region and the second bladder 116 or the fourth bladder 120 under the sacral region of the patient may be inflated or deflated independently to redistribute interface pressure from the mattress 16 on the patient. The lateral pressure redistribution helps the patient to relieve pressure on certain portions of the body to help reduce and prevent pressure ulcers. Pressure injuries, such as pressure ulcers and other skin breakdown, are localized damage to the skin and underlying soft tissue. Generally, the pressure injury is developed over a bony prominence. Pressure injuries develop as a result of intense pressure, prolonged pressure, pressure in combination with shear, or a combination thereof. The lateral pressure redistribution adjusts pressure points on the patient to reduce the formation of pressure ulcers.

Referring still to FIG. 31, the various protocols may be initiated by the caregiver via the connected user device 90 on the support apparatus 10. Additionally or alternatively, the controller 440 may be communicatively coupled with a remote user device 450 via a communication network 452. The remote user device 450 may be, for example, a phone, a tablet, a laptop, a wearable device, other mobile communication devices, etc.

The communication network 452 may be part of a network of the medical facility. The network may include a combination of wired connections and wireless connections, which may include the wireless communication network 452. The communication network 452 includes a variety of electronic devices, which may include a combination of various wired or wireless communication protocols. The communication network 452 may be implemented via one or more direct or indirect nonhierarchical communication protocols, including but not limited to, Bluetooth®, Bluetooth® low energy (BLE), Thread, Ultra-Wideband, Z-wave, ZigBee, etc.

Additionally, the communication network 452 may correspond to a centralized hierarchal communication network 452 where one or more of the devices communicate via a router (e.g., a communication routing controller). The communication network 452 may be implemented by a variety of communication protocols including, but not limited to, global system for mobile communication (GSM), general packet radio services, code division multiple access, enhanced data GSM environment, fourth generation (4G) wireless, fifth generation (5G) wireless, Wi-Fi, world interoperability for wired microwave access (WiMAX), local area network, Ethernet, etc. By flexibly implementing the communication network 452, various devices and servers may communicate with one another directly via the wireless communication network 452 or a cellular data connection.

The controller 440 disclosed herein may include various types of control circuitry, digital or analog, and may each include the processor 442, a microcontroller, an application specific circuit (ASIC), or other circuitry configured to perform the various input or output, control, analysis, or other functions described herein. The memory 444 described herein may be implemented in a variety of volatile and nonvolatile memory 444 formats. The routines 446 include operating instructions to enable various methods and functions described herein.

Figure 32:
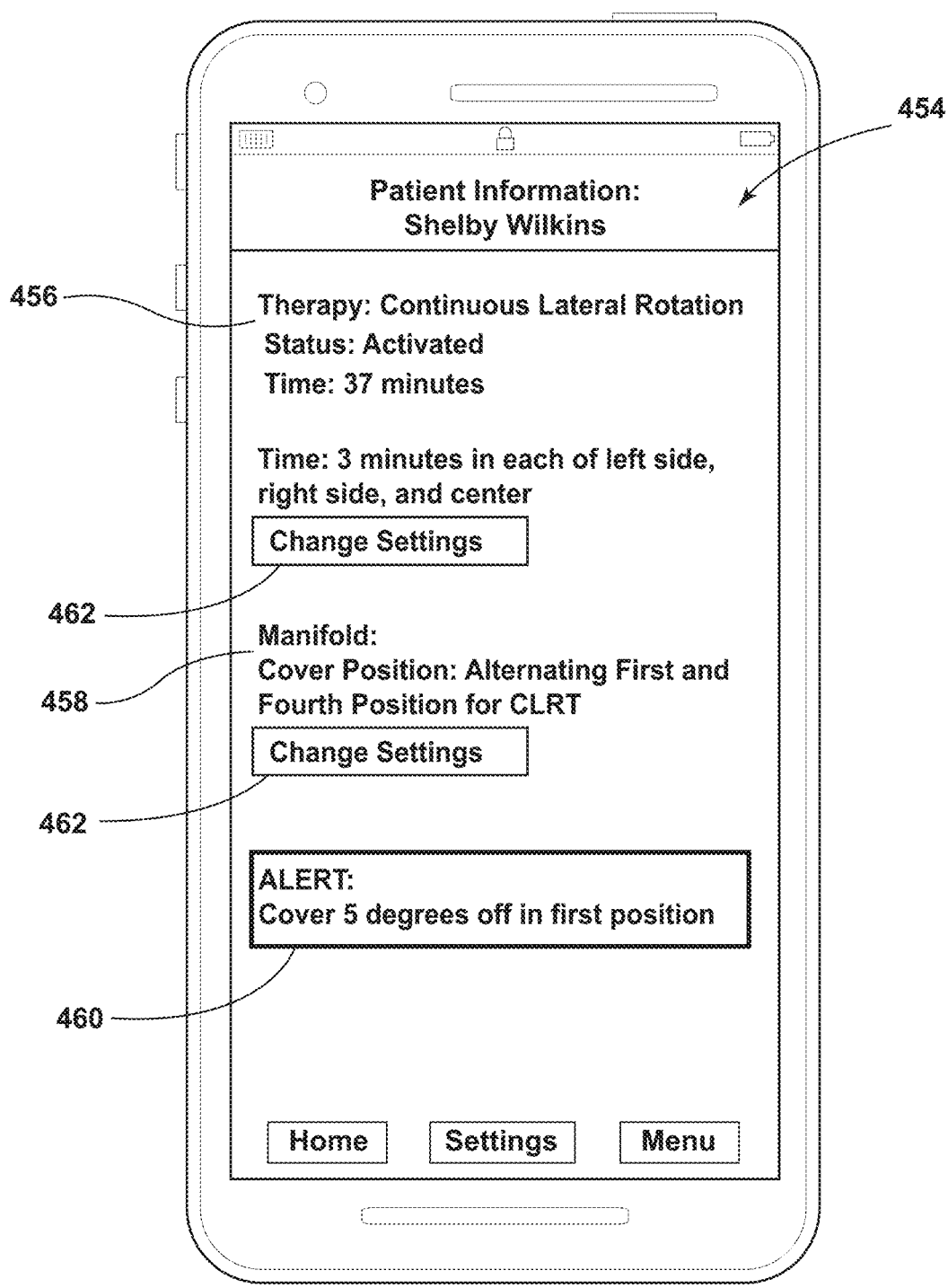
FIG. 32 is illustrative of an application interface displaying information and an alert related to a pneumatic system, according to the present disclosure.

Referring to FIG. 32, an exemplary application interface 454 of at least one of the connected user device 90 or the remote user device 450 is illustrated. The application interface 454 may be utilized to convey a variety of information to the caregiver, including information about the operation of the pneumatic system 110. The application interface 454 may include therapy information 456 for indicating the current therapy being applied to the patient. If no therapy is currently being applied, the therapy information 456 may also include which therapy should be applied and when.

The application interface 454 may also show position information 458 of the connector 36. Additionally or alternatively, the application interface 454 may also convey an alert message 460 to the caregiver about the position of the connector 36 of the manifold assembly 22. When the position detected by the motor 42 does not align with the position sensed by the optical switch 320, the application interface 454 may display, or otherwise convey, to the caregiver that the connector 36 may be misaligned and may need to be adjusted by the caregiver or a technician. The alert message 460 may indicate that the misalignment is within a predefined tolerance that does not substantially affect the performance of the manifold assembly 22. In such examples, the alert message 460 may be a warning to monitor the operation of the manifold assembly 22. Additionally or alternatively, the manifold assembly 22 may indicate that the misalignment is outside of the predefined tolerance and the efficiency of the manifold assembly 22 is being affected. The alert message 460 may be visual, audible, or haptic without departing from the teachings herein.

The application interface 454 may include adjustment features 462 for adjusting parameters of the pneumatic system 110. Various parameters relating to the bladders 20 may be adjusted by the caregiver. For example, the pressure inside the bladders 20 or the pressure applied to the patient by the bladders 20 may be adjusted. Additionally or alternatively, the adjustment sequence (e.g., an inflation and deflation sequence), time to inflate or deflate, therapy, etc. may be adjusted by the caregiver. In additional non-limiting examples, the parameter may relate to the connector 36. For example, the position of the connector 36 or the speed the connector 36 is rotating may be adjusted. These parameters are merely exemplary and are not considered limiting. It is contemplated that any of these parameters may be adjusted automatically by the controller 440, manually by the caregiver, or a combination thereof.

Figure 33:
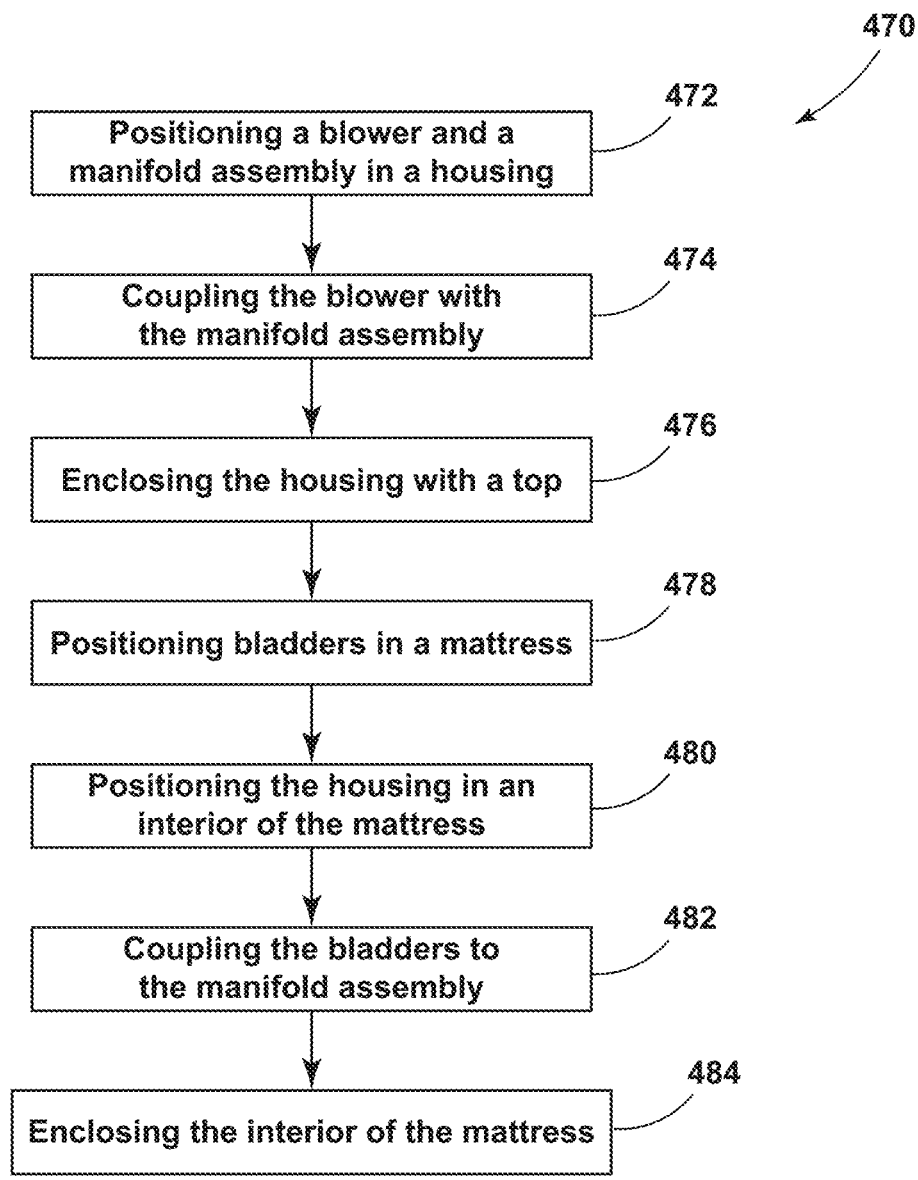
FIG. 33 is a flow diagram of a method of installing a pneumatic system within a mattress, according to the present disclosure.

Referring to FIG. 33, as well as FIGS. 1-32, a method 470 of installing the pneumatic system 110 in the support surface assembly 100, such as the mattress 16, includes step 472 of positioning the blower 112 and the manifold assembly 22 within the housing 140. The support member 214 and the support frame 210 may be fixed to the housing 140. Additionally, the blower 112 may be fixed to the support frame 210 and the manifold assembly 22 may be fixed to the support member 214. Also in step 472, the outlet cap 190 may be positioned to extend through the housing 140, with the rim 192 engaging the side 194 of the housing 140.

In step 474, the blower 112 is fluidly coupled to the manifold assembly 22. The tubing 174 is coupled to the blower 112 via the pressure connector 222 and the inlet tube 170 of the manifold core 24. The blower 112 may also be coupled to the hosing 224. Also in step 474, the sealant 202 may be utilized to provide an airtight engagement between the tubing 174 and the blower 112 and the manifold core 24. In step 476, the top 150 of the housing 140 may be positioned over the manifold assembly 22 and the blower 112 to generally enclose the blower 112 and the manifold assembly 22 in the housing 140.

In step 478, the bladders 20 may be positioned within the interior 18 of the mattress 16. The pneumatic system 110 may be an additional component added to the mattress 16 during manufacturing or by the caregiver at a later time. The bladders 20 are generally arranged as described herein, with the first and third bladders 114, 118 positioned under a back region of the patient and the second and fourth bladders 116, 120 positioned under the sacral region of the patient. In certain aspects, the mattress 16 may include markers or other alignment features for positioning the bladders 20.

In step 480, the housing 140, with the manifold assembly 22 and the blower 112, is positioned within the interior 18 of the mattress 16 proximate to the bladders 20. The housing 140 is generally positioned adjacent to the control box 130 that may generally already be positioned within the mattress 16. The coupling features 142, 144 of the housing 140 may slidably engage the coupling features 146, 148 of the control box 130 to selectively secure the housing 140 to the control box 130.

In step 482, the bladders 20 are coupled to the manifold assembly 22. The tubing 198 may be coupled to the bladders 20 and may be secured to the outlet cap 190 of the manifold assembly 22. The sealant 202 may be used between at least the outlet cap 190 and the tubing 198 to provide an airtight engagement. It is contemplated that the manifold assembly 22 and/or the bladders 20 may be labeled to assist in aligning the bladders 20 with the respective outlets 28, 30, 32, 34 of the manifold core 24. Further, different patterns of adjusting the bladders 20 may be used by coupling the tubing 198 to different outlets 28, 30, 32, 34 in step 482.

In step 484, the interior 18 of the mattress 16 is enclosed, and the pneumatic system 110, including the housing 140 with the manifold assembly 22, is enclosed within the interior 18 of the mattress 16. The upper covering portion 104 and the base covering portion 106 may be coupled together by the caregiver, obscuring the pneumatic system 110 from view. Accordingly, the pneumatic system 110 may be fully installed or embedded in the interior 18 of the mattress 16.

Figure 34:
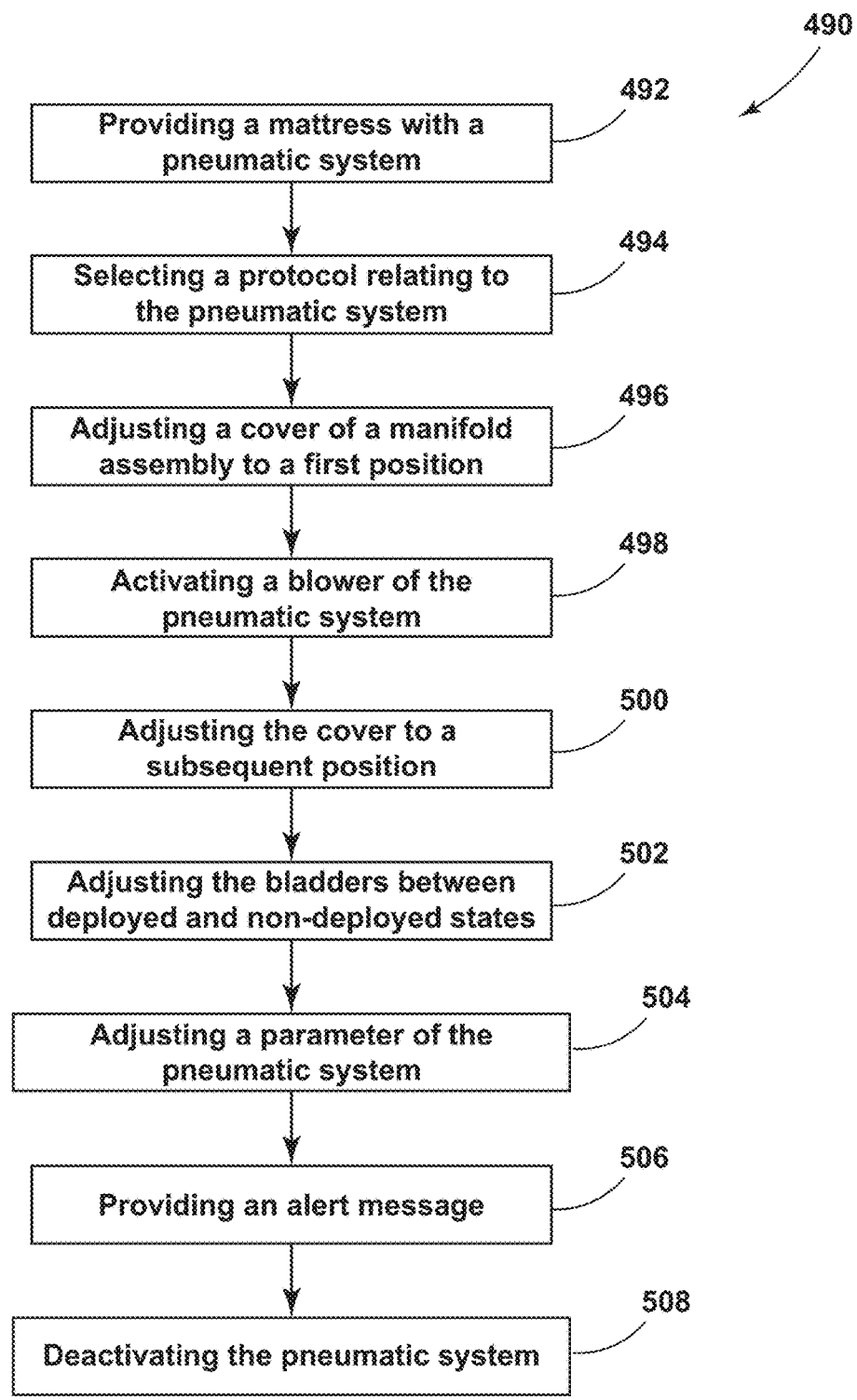
FIG. 34 is a flow diagram of a method of treating a patient with a pneumatic system, according to the present disclosure.

Referring to FIG. 34, as well as FIGS. 1-33, a method 490 of treating a patient with the support surface assembly 100 includes step 492 of providing the mattress 16 or other support surface assembly 100 on the support apparatus 10. The support surface assembly 100 includes the pneumatic system 110. In step 494, a predefined protocol relating to the pneumatic system 110 is selected. Generally, the caregiver may select the predefined protocol via the connected user device 90 or the remote user device 450. The predefined protocol may relate to various functions of the pneumatic system 110, such as the turn assist function or a therapy. In step 494, the selected protocol is communicated to the controller 440.

In step 496, the connector 36 of the manifold system is adjusted to one of the connecting positions 402, 404, 406, 408. The connector 36 adjusts from the block position 400 to the connecting position 402, 404, 406, 408 that adjusts the selected bladders 20 to the deployed state. The selected bladders 20 may differ based on the protocol selected in step 494. In various examples, the connector 36 may be adjusted at two different speeds. The connector 36 may initially rotate at the first speed and then the second speed as the connector 36 approaches the selected connecting position 402, 404, 406, 408.

In step 498, the blower 112 of the pneumatic system 110 is activated. Generally, the blower 112 is activated when the connector 36 reaches the selected connecting position 402, 404, 406, 408 from step 496. The blower 112 may be activated during intervals or may continuously remain activated. When activated for intervals, the blower 112 may remain activated for a predefined period of time, until the selected bladders 20 reach a predefined pressure, or until the connector 36 is rotated again.

In step 500, the connector 36 is adjusted to a subsequent position. The subsequent position may be the block position 400, a different connecting position 402, 404, 406, 408 than step 496, and/or one of the release positions 430, 432. The previously selected bladders 20 may be maintained or deflated, other bladders 20 may be inflated, or a combination thereof. The subsequent position may also be used to inflate and deflate bladders 20 simultaneously.

In step 502, the bladders 20 are selectively adjusted between the deployed state and the non-deployed state to provide the selected protocol. The bladders 20 may be adjusted to provide the turn assist function to assist the caregiver in turning the patient onto his or her side. Additionally or alternatively, at least one therapy may be provided by the pneumatic system 110. The therapy may be, for example, lateral pressure redistribution or a pulmonary therapy, such as continuous lateral rotation therapy.

In step 504, at least one parameter of the pneumatic system 110 may be adjusted automatically or by the caregiver. In various examples, the parameter may relate to the bladders 20. For example, the pressure inside the bladders 20, the pressure applied to the patient by the bladders 20, the adjustment sequence (e.g., an inflation and deflation sequence), time to inflate or deflate, etc. may be adjusted by the caregiver. In additional non-limiting examples, the parameter may relate to the connector 36. For example, the position of the connector 36 or the speed the connector 36 is rotating may be adjusted.

In step 506, the alert message 460 may be provided to the caregiver via the application interface 454. The alert message 460 may convey information about the operation of the pneumatic system 110, as well as information about misalignment of the connector 36. The caregiver may receive a visual, tactile, or haptic alert regarding the pneumatic system 110. The caregiver may monitor the status of the pneumatic system 110 and any selected therapy via the application interface 454. In certain aspects, the caregiver may utilize information from the alert message 460 to adjust the treatment of the patient, adjust the operation of the pneumatic system 110, and/or contact a technician regarding the manifold assembly 22.

In step 508, the pneumatic system 110 may be deactivated. The pneumatic system 110 may automatically be deactivated when a therapy is completed, after a predefined period of time, or manually by the caregiver. Each of the bladders 20 may be returned to the deflated position upon deactivation of the pneumatic system 110. Alternatively, each of the bladders 20 may be returned to a predefined inflated condition to provide support or comfort for the patient. It is also contemplated that the pneumatic system 110 may be utilized to increase the comfort of the patient on the support apparatus 10 as well as provide various protocols and therapies. Moreover, upon deactivation, the pneumatic system 110 may remain the mattress 16 or may be removed from the mattress 16. It is understood that the steps of the methods 470, 490 may be performed in any order, simultaneously, repeated, and/or omitted without departing from the teachings provided herein.

Use of the present device and system may provide for a variety of advantages. For example, the single manifold core 24 may be utilized to provide various inflation and deflation sequences of the bladders 20. Also, the manifold assembly 22 may be a separate assembly from other pumps and systems that may be included in the mattress 16. Additionally, the manifold connector 36 may be adjustable between the block position 400, multiple connecting positions 402, 404, 406, 408, multiple release positions 430, 432, and combinations thereof. Additionally, the retaining pin 342 extending through the driveshaft 248 retains the connector 36 to the manifold core 24 while the biasing member 264 biases the core toward the connector 36. Also, the optical switch 320 may be used to confirm or verify the position of the connector 36 in addition to the position determined by the motor 42. Further, the manifold core 24 may be fastened to the support member 214, such that force applied to the manifold assembly 22, for example, when installing the manifold assembly 22, may not adjust the retaining pin 342 from the position relative to the connector 36.

Additionally, the manifold assembly 22 may be an airtight system by using the sealant 202 such as grease, which reduces a number of components of the manifold assembly 22. Further, the manifold assembly 22 may include fewer components than conventional manifold systems, which provides more efficient manufacturing processes and can increase longevity of the manifold assembly 22. Moreover, the conical or frusto-conical shape of the biasing member 264 may reduce the number of components in the manifold assembly 22, while allowing the biasing member 264 to collapse or compress into a more compact configuration. Also, the pneumatic system 110 may provide lateral pressure redistribution functions, turn assist functions, and rotation therapy functions. Moreover, the manifold assembly 22 is integrated into the mattress 16, or other support surface assembly 100, and is not an accessory added to the outside of the mattress 16 on the footboard 80. Also, the manifold assembly 22 may also be a plug-in module for the mattress 16. Additionally, the manifold assembly 22 may utilize less space than conventional manifold systems. Further, the manifold assembly 22 may be lighter than conventional manifold systems, which may be advantageous for providing a lighter mattress 16 for the caregiver to move. Additional benefits or advantages may be realized and/or achieved.

The device disclosed herein is further summarized in the following paragraphs and is further characterized by combinations of any and all of the various aspects described therein.

According to another aspect of the present disclosure, a patient support apparatus includes a frame having a supporting surface. A mattress is disposed on the supporting surface. The mattress defines an interior. Bladders are disposed within the interior of the mattress and a manifold assembly is disposed within the interior of the mattress. The manifold assembly is in fluid communication with the bladders. The manifold assembly includes a manifold core having an inlet and multiple outlets. Each bladder is in fluid communication with one of the outlets. A connector is coupled to the manifold core. The connector has an inner side defining a recessed region. The inner side abuts the manifold core. A motor is configured to rotate the connector relative to the manifold core to fluidly couple the inlet with at least one of the outlets via an airflow passage defined at least partially by the recessed region.

According to another aspect of the present disclosure, a manifold assembly includes a retaining pin disposed within a groove of a connector. A driveshaft is coupled to a motor and the retaining pin is coupled with the driveshaft to retain the connector to a manifold core.

According to another aspect of the present disclosure, a manifold assembly includes an optical switch disposed proximate to a manifold connector to sense a position of a connector.

According to another aspect of the present disclosure, each bladder is selectively operable between a deployed state and a non-deployed state based on a position of a connector.

According to another aspect of the present disclosure, a rotational axis of a connector is normal to a direction of fluid through a manifold core.

According to another aspect of the present disclosure, a manifold assembly includes a housing. A manifold core and a motor are disposed at least partially within an interior of the housing.

According to another aspect of the present disclosure, a mattress includes a control box having electronics. A housing of a manifold assembly is selectively coupled to the control box within an interior of the mattress.

According to another aspect of the present disclosure, a manifold core defines outlet-connecting apertures in fluid communication with outlets via outlet channels, respectively. A connector defines release apertures. At least one of the release apertures is configured to align with at least one of the outlet-connecting apertures in a release position to release fluid from at least one bladder.

According to another aspect of the present disclosure, a blower is disposed within a housing and is fluidly coupled with an inlet of a manifold core.

According to another aspect of the present disclosure, a mattress includes a covering, which defines an interior. Multiple bladders are disposed within the interior. A manifold assembly is disposed within the interior. The manifold assembly includes a manifold core having an inlet tube extending from a first side thereof and defining an inlet and the manifold core has outlet tubes extending from a second side thereof. Each outlet tube defines an outlet. Each of the multiple bladders is in fluid communication with one of the outlets. A connector is coupled to the manifold core. The connector is configured to rotate between multiple positions to adjust the fluid communication between the inlet and at least one of the outlets. A blower is disposed within the interior of the mattress and in fluid communication with the inlet of the manifold assembly.

According to another aspect of the present disclosure, a first bladder of multiple bladders is adjusted between a deployed state and a non-deployed state when a connector is in a first connecting position which fluidly couples an inlet with an outlet.

According to another aspect of the present disclosure, a connector is configured to rotate in a range between 80 degrees and 85 degrees in a first direction from an initial position to be in a first connecting position.

According to another aspect of the present disclosure, a first bladder and a second bladder of multiple bladders are adjusted between a deployed state and a non-deployed state when a connector is in a second connecting position which fluidly couples an inlet with two outlets.

According to another aspect of the present disclosure, a connector is configured to rotate in a range between 120 degrees and 130 degrees in a first direction from an initial position to be in a second connecting position According to another aspect of the present disclosure, a third bladder is adjusted between the deployed state and the non-deployed state when a connector is in a third connecting position which fluidly couples an inlet with an outlet.

According to another aspect of the present disclosure, a connector is configured to rotate in a range between 80 degrees and 85 degrees in a second direction relative to an initial position to be in a third connecting position.

According to another aspect of the present disclosure, a third bladder and a fourth bladder are adjusted between a deployed state and a non-deployed state when a connector is in a fourth connecting position which fluidly couples an inlet with two outlets.

According to another aspect of the present disclosure, a connector is configured to rotate in a range between 120 degrees and 130 degrees in a second direction from an initial position to be in a fourth connecting position.

According to another aspect of the present disclosure, a connector defines a recessed region. A manifold core defines outlet-connecting apertures in fluid communication with outlets. A position of the recessed region determines which of the outlet-connecting apertures are in fluid communication with an inlet and, consequently, which bladders are adjusted between a deployed state and a non-deployed state.

According to another aspect of the present disclosure, a connector defines a release aperture configured to allow fluid to be released from at least one bladder when the connector is in a release position.

According to another aspect, multiple positions include a first connecting position and a second connecting position. A connector is configured to rotate in a first direction from an initial position to reach the first connecting position and a second direction from the initial position to reach the second connecting position.

According to another aspect of the present disclosure, a connector is configured to block fluid communication between an inlet and each outlet when in an initial position.

According to another aspect of the present disclosure, a support surface assembly includes a covering defining an interior. Bladders are disposed within the interior. The bladders are operable between a deployed state and a non-deployed state. A manifold assembly is disposed within the interior of the covering. The manifold assembly includes a manifold core defining an inlet and multiple outlets. An engagement surface of the manifold core defines an inlet-connecting aperture in fluid communication with the inlet and multiple outlet-connecting apertures each in fluid communication with one of the multiple outlets. A connector includes an inner side that abuts the engagement surface of the manifold core. The inner side defines a recessed region. A motor is coupled to the connector. The connector is configured to be rotated by the motor to fluidly couple the inlet-connecting aperture with at least one of the outlet-connecting apertures to adjust the respective bladders between the deployed state and the non-deployed state.

According to another aspect of the present disclosure, a position of a recessed region determines which outlet-connecting apertures are in fluid communication with an inlet-connecting aperture and consequently which bladders are adjusted between a deployed state and a non-deployed state.

According to another aspect of the present disclosure, a recessed region has two leg portions extending from a connecting portion. The connecting portion is disposed over an inlet-connecting aperture when a connector is in a block position preventing fluid communication between the inlet-connecting aperture and any outlet-connecting apertures.

According to another aspect of the present disclosure, a connecting portion is adjusted over at least one outlet-connecting aperture. At least one leg portion is adjusted over an inlet-connecting aperture when a connector is adjusted to a connecting position.

According to another aspect of the present disclosure, a connector is configured to be rotated between multiple positions to selectively adjust at least one bladder between a deployed state and a non-deployed state.

According to another aspect of the present disclosure, multiple positions include a block position that prevents fluid communication, a connecting position that allows adjustment of at least one bladder between a deployed state and a non-deployed state, and a release position that releases air from at least one of the bladders.

According to another aspect of the present disclosure, a deployed state is an inflated condition and a non-deployed state is a deflated condition.

According to another aspect of the present disclosure, a connector defines release apertures.

According to another aspect of the present disclosure, two bladders are adjusted to a non-deployed state when a connector is rotated to a release position to align release apertures align with respective outlet-connecting apertures.

According to another aspect of the present disclosure, a connector is configured to rotate in a range between 40 degrees and 50 degrees from an initial position to be in a release position.

According to another aspect of the present disclosure, fluid travels through a manifold assembly in a first direction to adjust at least one bladder to a deployed state and in a second direction to adjust at least one of the bladders to a non-deployed state. Each of the first direction and the second direction are normal to a rotational axis of a connector.

According to another aspect of the present disclosure, a manifold core includes an inlet tube extending from a first side thereof defining the inlet and multiple outlet tubes extending from a second side thereof. Each of the outlet tubes defines one of the outlets.

According to another aspect of the present disclosure, an inlet tube and outlet tubes are arranged in a parallel configuration.

According to another aspect of the present disclosure, a support surface assembly includes a covering defining an interior. Bladders are disposed within the interior. A blower is in fluid communication with the bladders and disposed within the interior. A manifold assembly is disposed within the interior of the covering. The manifold assembly includes a manifold core defining an inlet and multiple outlets. Each outlet is in fluid communication with one of the bladders. A connector is rotatably coupled to the manifold core. Connecting positions of the connector provide selective fluid communication between the inlet and at least one of the outlets to adjust at least one of the bladders to a deployed state. The connector defines a release aperture configured to allow fluid to be released from at least one of the bladders when the connector is in a release position.

According to another aspect of the present disclosure, a manifold assembly includes a motor assembly including a motor and a driveshaft. The driveshaft extends through a manifold core to engage a connector.

According to another aspect of the present disclosure, a manifold assembly includes a retaining pin that extends through a driveshaft and is disposed within a groove defined by a connector.

According to another aspect of the present disclosure, a connector is configured to rotate in a first direction and a second direction from an initial position to reach at least one connecting position.

According to another aspect of the present disclosure, a first direction is a clockwise direction and a second direction is a counterclockwise direction.

According to another aspect of the present disclosure, an initial position is a block position that prevents fluid communication between an inlet and any outlet.

According to another aspect of the present disclosure, a manifold assembly includes an optical switch coupled to a manifold core to sense a position of a connector.

According to another aspect of the present disclosure, a manifold assembly includes a support member and a biasing member. The biasing member is coupled between the support member and a manifold core and biases the manifold core toward a connector.

According to another aspect of the present disclosure, a biasing member is a spring having first diameter proximate to a support member and a second diameter proximate to a manifold core. The second diameter is greater than the first diameter.

According to another aspect of the present disclosure, a manifold assembly includes a motor and a driveshaft. The driveshaft extends through a support member, a biasing member, a manifold core, and a connector.

According to another aspect of the present disclosure, a manifold core is fastened to a support member According to another aspect of the present disclosure, a pneumatic system for a mattress includes bladders operable between a deployed state and a non-deployed state. A housing is configured to be disposed within an interior of said mattress. A manifold assembly is disposed within the housing and in fluid communication with the bladders. The manifold assembly includes a manifold core having an inlet and outlets. An engagement surface of the manifold core defines an inlet-connecting aperture in fluid communication with the inlet and defines outlet-connecting apertures each in fluid communication with one of the outlets. A connector is rotatably coupled to the manifold core. The connector is configured to rotate between multiple positions relative to the manifold core to fluidly couple the inlet-connecting aperture with at least one of the outlet-connecting apertures.

According to another aspect of the present disclosure, a blower is disposed within a housing and is in fluid communication with an inlet.

According to another aspect of the present disclosure, a controller is communicatively coupled with a manifold assembly. The controller is configured to activate the manifold assembly to adjust a position of a connector to provide at least one of turn assist, pulmonary therapy, and lateral pressure redistribution According to another aspect of the present disclosure, a controller is configured to communicate information relating to said pneumatic system to a remote user device.

According to another aspect of the present disclosure, a motor is configured to rotate a connector between the multiple positions. The connector is configured to initially be rotated at a first speed and then at a second speed when approaching one of the multiple positions. The second speed is slower than the first speed.

According to another aspect of the present disclosure, a manifold assembly for a mattress includes a manifold core configured to be disposed within an interior of said mattress. The manifold core includes an inlet tube extending from a first side thereof and outlet tubes extending from a second side thereof. The inlet tube defines an inlet and each of the outlet tubes defines an outlet. An engagement surface of the manifold core defines an inlet-connecting aperture in fluid communication with the inlet and defines outlet-connecting apertures in fluid communication with outlets. A connector is rotatably coupled to the manifold core. The connector abuts the manifold core to define an airflow passage. A position of the connector determines which of the outlets is in fluid communication with the inlet. A motor assembly has a motor and a driveshaft. The driveshaft extends through the manifold core and the connector. A retaining pin extends through the driveshaft to couple the motor assembly to the connector. An optical switch is disposed proximate to the connector. The optical switch is configured to sense the position of the connector.

According to another aspect of the present disclosure, a manifold assembly includes a sealant to form airtight engagements.

According to another aspect of the present disclosure, a sealant is grease.

According to another aspect of the present disclosure, a motor is configured to rotate a connector in two opposing directions to adjust a connector between multiple positions.

According to another aspect of the present disclosure, multiple positions include a block position to prevent fluid communication between an inlet and any outlets and connecting positions that selectively allow fluid engagement between the inlet and at least one of the outlets.

According to another aspect of the present disclosure, multiple positions include release positions configured to release fluid from at least one bladder in fluid communication with said manifold assembly.

According to another aspect of the present disclosure, a method of installing a pneumatic system within support surface assembly includes positioning a manifold assembly within a housing. The manifold assembly has a connector rotatably coupled to a manifold core and configured to rotate in two directions to provide a plurality of airflow paths between an inlet tube of the manifold core and outlet tubes of the manifold core. A blower is positioned within the housing. The blower is in fluid communication with an inlet of the manifold assembly. The housing is positioned within an interior of a mattress. Bladders are positioned within the mattress. The bladders are coupled to outlets of the manifold assembly. The interior of the mattress is enclosed.

According to another aspect of the present disclosure, a step of positioning bladders includes arranging the bladders in two pairs with each pair on an opposing side of a longitudinal axis of a mattress.

According to another aspect of the present disclosure, a step of positioning a housing in an interior includes coupling the housing to a control box positioned within a mattress.

According to another aspect of the present disclosure, a step of enclosing an interior includes coupling an upper covering portion with a base covering portion to obscure bladders and a housing from view.

According to another aspect of the present disclosure, a method for treating a patient with a pneumatic system includes providing a support surface assembly having a manifold assembly disposed within an interior of the support surface assembly and in fluid communication with bladders. A protocol relating to said pneumatic system is selected. A connector of the manifold assembly is adjusted to a first position. A blower is activated to direct fluid through the manifold assembly. The connector is adjusted to a subsequent position. The bladders are adjusted between a deployed state and a non-deployed state based on the protocol.

According to another aspect of the present disclosure, a step of adjusting bladders includes adjusting the bladders to provide at least one of turn assist, pulmonary therapy, and lateral pressure redistribution.

According to another aspect of the present disclosure, a method includes adjusting a parameter of a pneumatic system.

According to another aspect of the present disclosure, a method includes providing an alert message relating to a pneumatic system.

A means for supporting a patient includes a first support means having a supporting surface. A second support means disposed on the supporting surface. The second support means defines an interior. Inflation means disposed within the interior of the second support means. A means for adjusting is disposed within the interior of the second support means. The means for adjusting is in fluid communication with the inflation means. The means for adjusting includes a coupling means having an inlet and multiple outlets. Each inflation means is in fluid communication with one of the outlets. A direction means is coupled to the coupling means. Wherein the direction means has an inner side defining a recessed region. The inner side abuts the coupling means. A driving means configured to rotate the direction means relative to the coupling means to fluidly couple the inlet with at least one of the outlets via an airflow passage defined at least partially by the recessed region.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A patient support apparatus, comprising:
a frame having a supporting surface;
a mattress disposed on the supporting surface, wherein the mattress defines an interior;
bladders disposed within the interior of the mattress; and
a manifold assembly disposed within the interior of the mattress, wherein the manifold assembly is in fluid communication with the bladders, and wherein the manifold assembly includes:
a manifold core having an inlet-connecting aperture in fluid communication with an inlet and outlet-connecting apertures in fluid communication with multiple outlets, respectively, with the inlet on an opposing side of a centerline compared to the multiple outlets, wherein each bladder is in fluid communication with one of the multiple outlets;
a connector coupled to the manifold core, wherein the connector has an inner side defining a recessed region having a connecting portion in fluid communication with a first leg portion extending on a first side of a driveshaft aperture and a second leg portion extending on a second side of the driveshaft aperture, and wherein each of the first and second leg portions includes a groove between the connecting portion and an end of the first and second leg portions, respectively, and further wherein the inner side abuts the manifold core; and
a motor configured to rotate the connector relative to the manifold core to adjust the recessed region relative to the inlet and the multiple outlets and fluidly couple the inlet with at least one of the multiple outlets via an airflow passage defined between the recessed region and an engagement surface of the manifold core, wherein the motor is configured to rotate the connector to position the connecting portion over one of the outlet-connecting apertures and one of the grooves over the inlet-connecting aperture to direct airflow along the airflow passage to one of the bladders.

2. The patient support apparatus of claim 1, wherein the manifold assembly includes a retaining pin disposed within a groove of the connector, wherein a driveshaft is coupled to the motor and the retaining pin is coupled with the driveshaft to retain the connector to the manifold core.

3. The patient support apparatus of claim 1, wherein the manifold assembly includes an optical switch disposed proximate to the connector to sense a position of the connector.

4. The patient support apparatus of claim 1, wherein each of the bladders is selectively operable between a deployed state and a non-deployed state based on a position of the connector.

5. The patient support apparatus of claim 1, wherein a rotational axis of the connector is normal to a direction of fluid through the manifold core.

6. The patient support apparatus of claim 1, wherein the manifold assembly includes a housing, and wherein the manifold core and the motor are disposed at least partially within an interior of the housing.

7. The patient support apparatus of claim 6, wherein the mattress includes a control box having electronics, and wherein the housing of the manifold assembly is selectively coupled to the control box within the interior of the mattress.

8. The patient support apparatus of claim 1, wherein the manifold core defines the outlet-connecting apertures in fluid communication with the multiple outlets via outlet channels, respectively, wherein the connector defines release apertures, and wherein at least one of the release apertures is configured to align with at least one of the outlet-connecting apertures in a release position to release fluid from at least one of the bladders.

9. The patient support apparatus of claim 8, wherein the release apertures are defined proximate to the ends of the first and second leg portions of the recessed region, respectively.

10. The patient support apparatus of claim 1, wherein a rotational axis of the connector is normal to a direction of fluid through the manifold core and in the airflow passage across the engagement surface of the manifold core.

11. The patient support apparatus of claim 1, wherein the outlet-connecting apertures are in fluid communication with the multiple outlets via outlet channels, respectively, and wherein the inlet-connecting aperture is in fluid communication with the inlet via an inlet channel.

12. The patient support apparatus of claim 1, wherein the motor is configured to rotate the connector to position one of the first and second leg portions over the inlet-connecting aperture and the connecting portion over at least one of the outlet-connecting apertures to direct the airflow to at least one of the bladders.

13. The patient support apparatus of claim 1, wherein the motor is configured to rotate the connector to position the connecting portion over two of the outlet-connecting apertures and the end of one of the first and second leg portions over the inlet-connecting aperture to direct the airflow to two of the bladders.

14. The patient support apparatus of claim 1, wherein the manifold assembly includes a support member, and wherein the manifold core and the motor are on opposing sides of a support wall of the support member.

15. The patient support apparatus of claim 14, wherein the manifold assembly includes a biasing member disposed between the support wall and the manifold core to bias the manifold core toward the connector.

16. The patient support apparatus of claim 15, wherein the biasing member is a compression spring having a first diameter proximate the support wall and a second diameter proximate the manifold core, the second diameter being smaller than the first diameter.

17. The patient support apparatus of claim 1, wherein the connector defines release apertures proximate to the ends of the first and second leg portions of the recessed region.

18. The patient support apparatus of claim 1, wherein the inlet is defined by an inlet tube extending in a first direction from the manifold core, and wherein the multiple outlets are defined by outlet tubes, respectively, extending in a second direction from the manifold core.

* * * * *